(12) United States Patent
Hu et al.

(10) Patent No.: US 12,010,402 B2
(45) Date of Patent: Jun. 11, 2024

(54) DATA PROCESSING FOR IMMERSIVE MEDIA

(71) Applicant: Tencent Technology (Shenzhen) Company Limited, Guangdong (CN)

(72) Inventors: Ying Hu, Shenzhen (CN); Xiaozhong Xu, Shenzhen (CN); Shan Liu, Shenzhen (CN); Byeongdoo Choi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 42 days.

(21) Appl. No.: 17/731,162

(22) Filed: Apr. 27, 2022

(65) Prior Publication Data
US 2022/0272424 A1      Aug. 25, 2022

Related U.S. Application Data

(63) Continuation of application No. PCT/CN2021/085907, filed on Apr. 8, 2021.

(30) Foreign Application Priority Data

Jun. 4, 2020   (CN) .......................... 202010501322.X

(51) Int. Cl.
*H04N 21/845* (2011.01)
*H04N 21/8545* (2011.01)

(52) U.S. Cl.
CPC ..... *H04N 21/8456* (2013.01); *H04N 21/8545* (2013.01)

(58) Field of Classification Search
CPC ..... H04N 21/21805; H04N 21/234345; H04N 21/234363; H04N 21/23439;
(Continued)

(56) References Cited

U.S. PATENT DOCUMENTS

| 9,208,577 | B2 | 12/2015 | Acquavella et al. |
| 2018/0376152 | A1* | 12/2018 | Wang ................. H04N 19/89 |
| 2019/0306519 | A1* | 10/2019 | Chen ............... H04N 21/85406 |
| 2019/0320190 | A1* | 10/2019 | Wang ................. H04N 23/698 |

(Continued)

FOREIGN PATENT DOCUMENTS

| CN | 105704581 A | 6/2016 |
| CN | 107534801 A | 1/2018 |

(Continued)

OTHER PUBLICATIONS

International Search Report and Written Opinion for PCT/CN2021/085907, issued Jun. 29, 2021, 13 pages, English translation included.

(Continued)

*Primary Examiner* — Rong Le
(74) *Attorney, Agent, or Firm* — ARENTFOX SCHIFF LLP

(57) ABSTRACT

In a data processing method for an immersive media, independently coded region description information of an independently coded region of the immersive media is acquired. The independently coded region corresponds to a segmented video of a plurality of segmented videos encapsulated in tracks of a same track group. The independently coded region description information includes an independently coded region information and coordinate information. The coordinate information includes coordinate system identification information that indicates a coordinate system of the independently coded region. Further, the segmented video of the immersive media is displayed according to the independently coded region description information. Apparatus and non-transitory computer-readable storage medium counterpart embodiments are also contemplated.

20 Claims, 9 Drawing Sheets

(58) Field of Classification Search
CPC ..... H04N 21/26258; H04N 21/440236; H04N 21/44218; H04N 21/816; H04N 21/84; H04N 21/8456; H04N 21/8545
See application file for complete search history.

(56) References Cited

U.S. PATENT DOCUMENTS

| | | | |
|---|---|---|---|
| 2019/0373245 A1* | 12/2019 | Lee | H04N 21/8456 |
| 2019/0379884 A1 | 12/2019 | Oh et al. | |
| 2021/0377581 A1* | 12/2021 | Denoual | H04N 21/23439 |
| 2022/0141487 A1* | 5/2022 | Oh | G06T 15/00 |
| | | | 375/240.08 |

FOREIGN PATENT DOCUMENTS

| | | | |
|---|---|---|---|
| CN | 107948685 A | 4/2018 |
| CN | 110225371 A | 9/2019 |
| CN | 110771162 A | 2/2020 |
| CN | 111133763 A | 5/2020 |
| TW | 201946464 A | 12/2019 |
| WO | 2019199024 A1 | 10/2019 |
| WO | 2020002122 A1 | 1/2020 |

OTHER PUBLICATIONS

Supplementary European Search Report for 21818517.1, issued Oct. 27, 2023, 9 pages.
Deshpande et al: "[OMAF] Draft Text for Potential Improvement of 2nd Ed. of 23090-2", 131. MPEG Meeting; Jun. 29, 2020-Jul. 3, 2020; Online; (Motion Picture Expert Group or ISO/IEC JTC1/SC29/WG11), No. m54026, May 16, 2020, pp. 1-316.

* cited by examiner

```
┌─────────────────────────────────────────────────────────────┐
│ Acquire an independently coded region description box of an ith independently │ ─── S201
│  coded region of an immersive media, the ith independently coded region        │
│  corresponding to an ith segmented video, the independently coded region       │
│  description box including an independently coded region box and a coordinate  │
│           infobox, i and N being positive integers, and i≤N;                   │
└─────────────────────────────────────────────────────────────┘
                              │
                              ▼
┌─────────────────────────────────────────────────────────────┐
│   Display the ith segmented video of the immersive media according to the      │ ─── S202
│                independently coded region description box                      │
└─────────────────────────────────────────────────────────────┘
```

FIG. 2

```
┌─────────────────────────────────────────────────────────────┐
│          Partition an immersive media into N segmented videos                  │ ─── S301
└─────────────────────────────────────────────────────────────┘
                              │
                              ▼
┌─────────────────────────────────────────────────────────────┐
│  Respectively encapsulate the N segmented videos to N tracks, an ith           │
│  segmented video being encapsulated in an ith track, the ith segmented         │ ─── S302
│  video corresponding to an ith independently coded region, i and N being       │
│  positive integers, i≤N, and the N tracks belonging to a same track group      │
└─────────────────────────────────────────────────────────────┘
                              │
                              ▼
┌─────────────────────────────────────────────────────────────┐
│    Generate an independently coded region description box of the ith           │
│  independently coded region according to an encapsulation process of the       │ ─── S303
│   ith segmented video, the independently coded region description box          │
│    including an independently coded region box and a coordinate infobox        │
└─────────────────────────────────────────────────────────────┘
```

FIG. 3

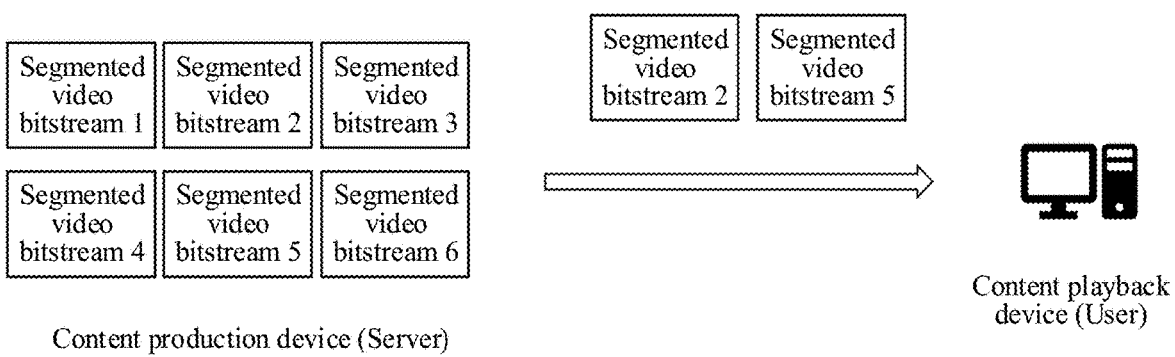

FIG. 4A

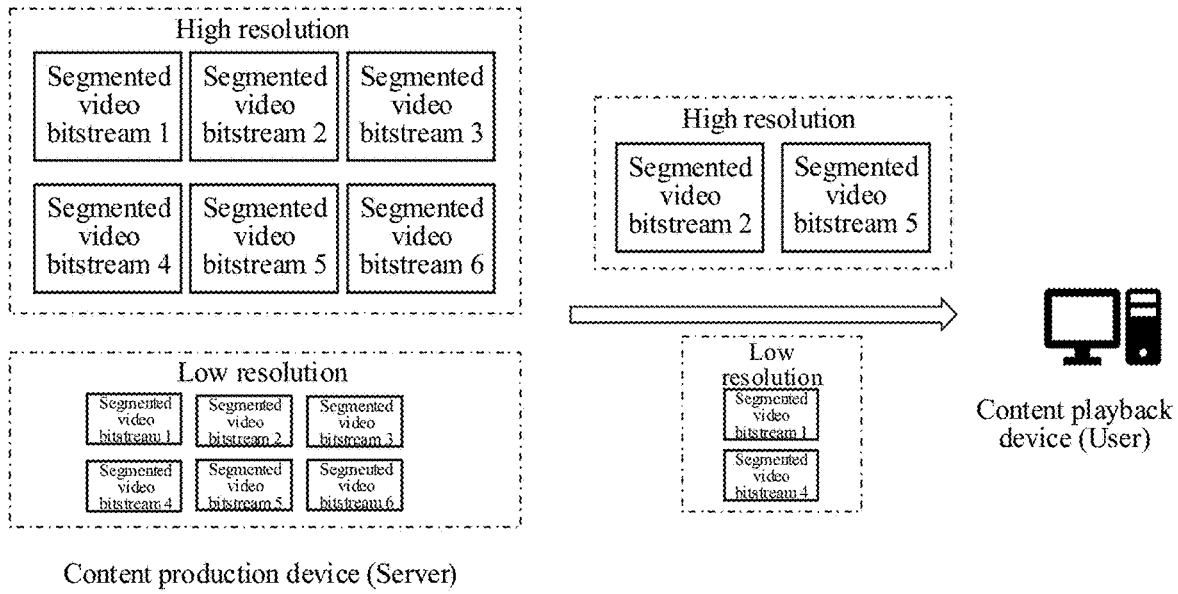

FIG. 4B

Acquire a packed file of an immersive media, the immersive media including N segmented videos, the N segmented videos being encapsulated to N tracks, an ith segmented video being encapsulated in an ith track, the N tracks belonging to a same track group; the ith segmented video corresponding to an ith independently coded region; and the packed file at least including the ith track, the ith track including an independently coded region description box of the ith independently coded region, i and N being integers, and i≤N; — S501

De-encapsulate the packed file to obtain the independently coded region description box of the ith independently coded region, the independently coded region description box including an independently coded region box and a coordinate infobox — S502

Display the ith segmented video of the immersive media according to the independently coded region description box — S503

FIG. 5

DATA PROCESSING FOR IMMERSIVE MEDIA

RELATED APPLICATIONS

This application is a continuation of PCT/CN2021/085907, entitled "IMMERSIVE MEDIA DATA PROCESSING METHOD, APPARATUS AND DEVICE, AND COMPUTER STORAGE MEDIUM" and filed on Apr. 8, 2021, which claims priority to Chinese Patent Application No. 202010501322.X, entitled "DATA PROCESSING METHOD, APPARATUS, AND DEVICE FOR IMMERSIVE MEDIA, AND COMPUTER STORAGE MEDIUM", filed on Jun. 4, 2020. The entire disclosures of the prior applications are hereby incorporated by reference in their entirety.

FIELD OF THE TECHNOLOGY

This application relates to the technical field of computers and the technical field of virtual reality (VR).

BACKGROUND OF THE DISCLOSURE

In the related art, the content of an immersive media is partitioned into a plurality of sub-picture frames, and these sub-picture frames are encapsulated in a plurality of track groups according to the correlation. The so-called correlation means that the plurality of sub-picture frames in the same track group belong to the same immersion media and have the same resolution. This correlation limits the encapsulation flexibility of the immersive media to a certain extent. For example, in a viewing angle adaptive transmission solution of the immersive media, in order to ensure that a corresponding picture can be presented in time when the head of a user moves, a viewing angle transmitted to the user includes high-definition segmented videos of a current viewing angle of the user and also includes low-definition segmented videos around the current viewing angle of the user. The two kinds of videos belong to the same video content, but are videos of different resolution versions. In the related art, the two kinds of videos are encapsulated to different track groups, so it is difficult to indicate a consumption relationship between the two track groups. As a result, an inconvenience is brought to the presentation of a content playback device.

SUMMARY

Embodiments of this disclosure include data processing methods, apparatuses, and devices for an immersive media, and non-transitory computer-readable storage mediums. For example, a plurality of segmented videos (having a same resolution or different resolutions) belonging to different spaces of a same immersive media can be all encapsulated to a same track group, and consumption relationships between all tracks in the track group are indicated using an independently coded region description box. Accordingly, convenience of the presentation of the immersive media can be improved.

An embodiment of this disclosure provides a data processing method for an immersive media. Independently coded region description information of an independently coded region of the immersive media is acquired. The independently coded region corresponds to a segmented video of a plurality of segmented videos encapsulated in tracks of a same track group. The independently coded region description information includes an independently coded region information and coordinate information. The coordinate information includes coordinate system identification information that indicates a coordinate system of the independently coded region. Further, the segmented video of the immersive media is displayed according to the independently coded region description information An embodiment of this disclosure provides a data processing method for an immersive media. An immersive media is partitioned into a plurality of segmented videos. The plurality of segmented videos is encapsulated into respective tracks in a same track group. A segmented video of the plurality of segmented videos corresponds to an independently coded region. Independently coded region description information of the independently coded region is generated according to the encapsulation of the segmented video. The independently coded region description information includes independently coded region information and coordinate information. The coordinate information includes coordinate system identification information that indicates a coordinate system of the independently coded region.

An embodiment of this disclosure provides a data processing apparatus for an immersive media, including:

an acquisition unit, configured to acquire an independently coded region description box of an ith independently coded region of an immersive media, the ith independently coded region corresponding to an ith segmented video; and the independently coded region description box including an independently coded region box and a coordinate infobox, i and N being positive integers, and i≤N; and a processing unit, configured to display the ith segmented video of the immersive media according to the independently coded region description box.

An embodiment of this disclosure provides another data processing apparatus for an immersive media, including processing circuitry. The processing circuitry is configured to acquire independently coded region description information of an independently coded region of the immersive media. The independently coded region corresponds to a segmented video of a plurality of segmented videos encapsulated in tracks of a same track group. The independently coded region description information includes an independently coded region information and coordinate information. The coordinate information includes coordinate system identification information that indicates a coordinate system of the independently coded region. Further, the processing circuitry is configured to output for display the segmented video of the immersive media according to the independently coded region description information.

An embodiment of this disclosure provides another data processing apparatus for an immersive media, including processing circuitry. The processing circuitry is configured to partition an immersive media into a plurality of segmented videos. The processing circuitry is configured to encapsulate the plurality of segmented videos into respective tracks in a same track group. A segmented video of the plurality of segmented videos corresponds to an independently coded region. The processing circuitry is further configured to generate independently coded region description information of the independently coded region according to the encapsulation of the segmented video. The independently coded region description information includes independently coded region information and coordinate information. The coordinate information includes coordinate system identification information that indicates a coordinate system of the independently coded region.

An embodiment of this disclosure further provides a non-transitory computer-readable storage medium. The computer-readable storage medium stores instructions which when executed by a processor cause the processor to perform any of the data processing methods for an immersive media.

In some embodiments of this disclosure, N segmented videos (having a same resolution or different resolutions) belonging to a same immersive media are encapsulated to N track groups, and the N track groups are encapsulated to a same track group. In this way, the embodiments can be applicable to more transmission scenarios, for example, a viewing angle adaptive transmission scenario of the immersive media; furthermore, the transmission process of the immersive media is more reliable, and unnecessary internal memory overhead caused by storage different versions of videos in a content production device. At the same time, the concept of the independently coded region corresponding to all the segmented videos is introduced; the consumption relationship between an ith track and other tracks in the track group is indicated through the independently coded region description box of the ith independently coded region; and a more convenient and accurate presentation effect can be achieved during displaying, according to the independently coded region description box of the ith independently coded region, the ith independently coded region.

BRIEF DESCRIPTION OF THE DRAWINGS

FIG. 2 illustrates a flow chart of a data processing method for an immersive media system provided by an embodiment of this disclosure.

FIG. 3 illustrates a flow chart of another data processing method for an immersive media system provided by an embodiment of this disclosure.

FIG. 4A illustrates a diagram of an application scenario of immersive media transmission provided by an embodiment of this disclosure.

FIG. 4B illustrates a diagram of an application scenario of another immersive media transmission provided by an embodiment of this disclosure.

FIG. 5 illustrates a flow chart of another data processing method for an immersive media provided by an embodiment of this disclosure.

DESCRIPTION OF EMBODIMENTS

Technical solutions in the embodiments of this disclosure are described in the following with reference to the accompanying drawings in the embodiments of this disclosure. The described embodiments are merely some rather than all of the embodiments of this disclosure. Other embodiments are within the scope of this disclosure.

This disclosure includes embodiments related to a data processing technology for an immersive media. The so-called immersive media can refer to a media file that can provide immersive media content so that users who are immersed in the media content can obtain visual, auditory, and other sensory experiences in a real world. The immersive media can be a 3 degrees of freedom (DoF) immersive media, a 3DoF+ immersive media or a 6DoF immersive media. The immersive media content includes video content represented in a 3-dimension (3D) space in various forms, such as a three-dimensional video content represented in a spherical form. The immersive media content can be a VR video content, a panoramic video content, a spherical video content or a 360-degree video content. Therefore, the immersive media can also be referred to as VR video, panoramic video, spherical video or 360-degree video. In addition, the immersive media content also includes audio content that is synchronized with the video content represented in the three-dimensional space.

Figure 1A:
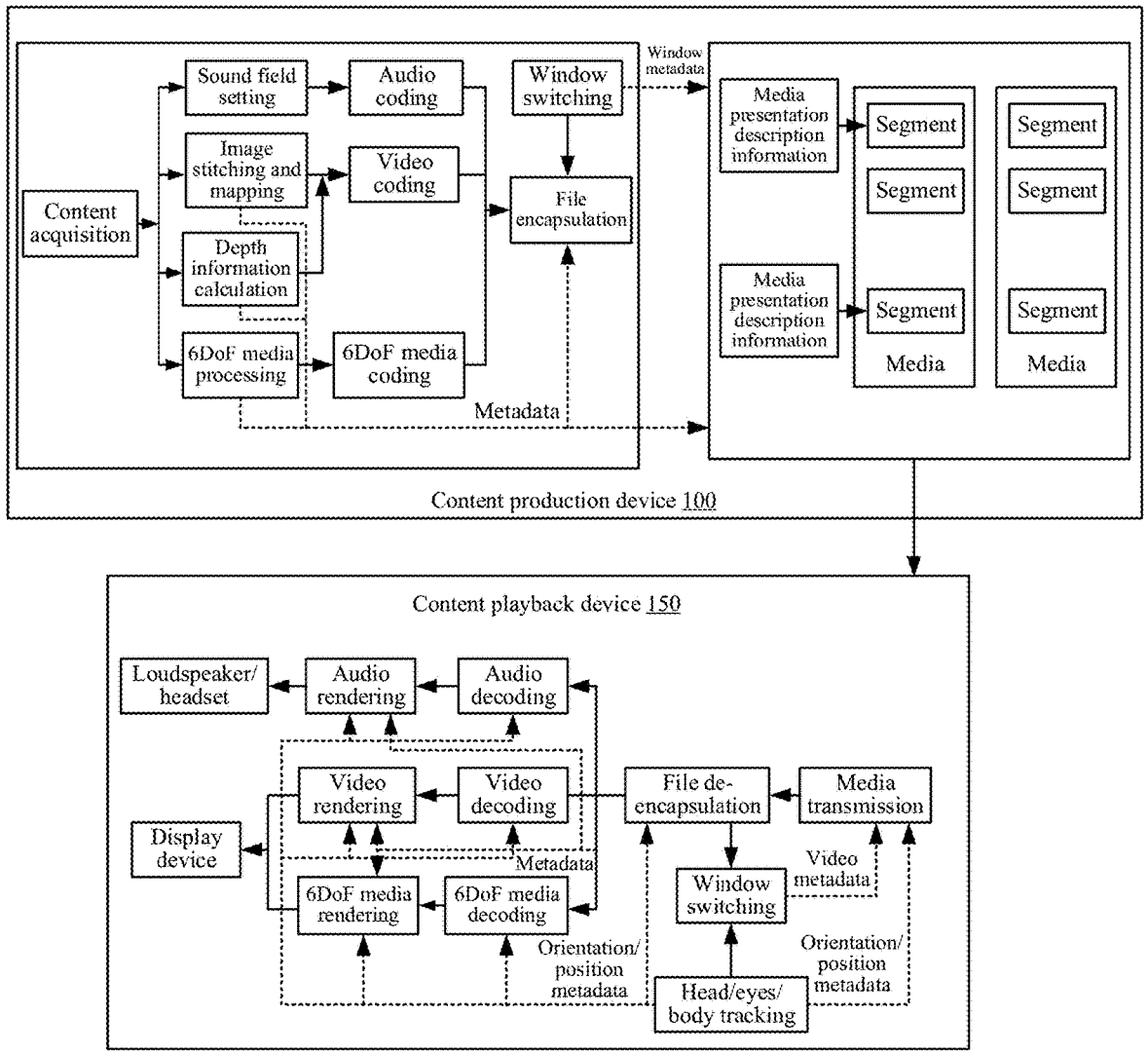
FIG. 1A illustrates an architecture diagram of an immersive media system provided by an embodiment of this disclosure.

FIG. 1A illustrates an architecture diagram of an immersive media system provided by an embodiment of this disclosure. As shown in FIG. 1A, an immersive media system includes a content production device 100 and a content playback device 150. The content production device may refer to a computer device used by a provider of the immersive media (e.g., a content producer of the immersive media). The computer device may be a terminal (e.g. a personal computer (PC), a smart mobile device (e.g., a smartphone) or a server. The content playback device may refer to a computer device used by a user of the immersive media (e.g., a customer), and the computer device may be a terminal (e.g., a PC, a smart mobile device such as a smartphone, a VR device such as a VR helmet and VR glasses). A data processing process of the immersive media includes a data processing process on the content production device side and a data processing process on the content playback device side.

The data processing process on the content production device side can include: (1) an acquisition and production process of a media content of the immersive media; (2) a coding and file encapsulation process of immersive media. The data processing process on the content playback device can include: (3) a file de-encapsulation and decoding process of the immersive media; (4) a rendering process of the immersive media. In addition, a transmission process of the immersive media is involved between the content production device and the content playback device, and may be carried out on the basis of various transmission protocols. The transmission protocols here may include, but are not limited to: a dynamic adaptive streaming over HTTP (DASH) protocol, an HTTP live streaming (HLS) protocol, a smart media transport protocol (SMTP), a transmission control protocol (TCP), and the like.

Figure 1B:
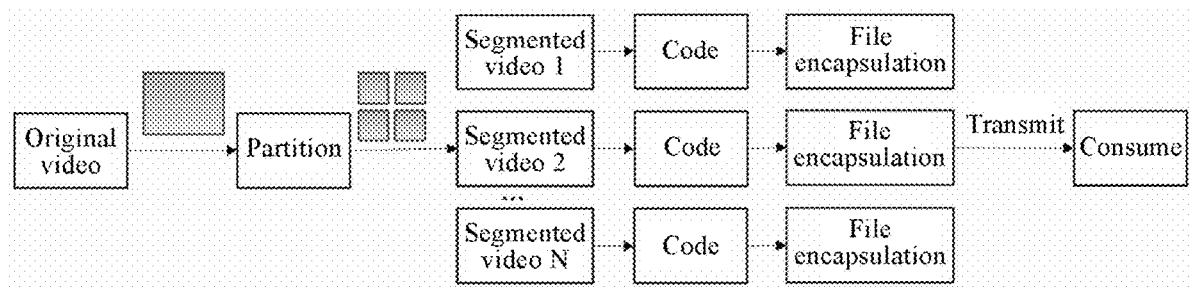
FIG. 1B illustrates a flow chart of a transmission solution of an immersive media system provided by an embodiment of this disclosure.

FIG. 1B illustrates a flow chart of an exemplary transmission solution of an immersive media system provided by an embodiment of this disclosure. As shown in FIG. 1B, in order to solve the transmission bandwidth load problem caused by the excessive data volume of the immersive media itself, during the processing of the immersive media, an original video is usually spatially divided into a plurality of segmented videos, coded and encapsulated, and transmitted to a client for consumption.

Processes involved in the data processing process of the immersive media are introduced in detail below.

Figure 1C:
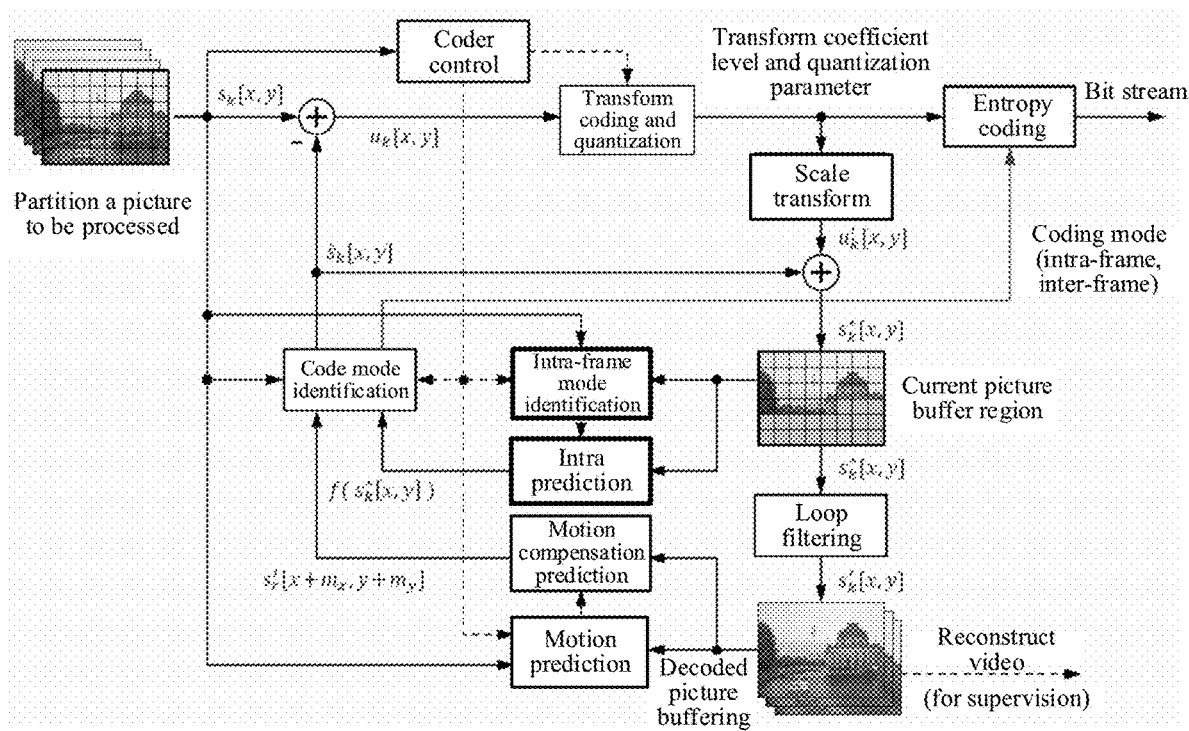
FIG. 1C illustrates a basic block diagram of video coding provided by an embodiment of this disclosure.

FIG. 1C illustrates a basic block diagram of video coding provided by an embodiment of this disclosure. The various processes involved in the data processing process of the immersive media are described in detail with reference to FIGS. 1A-1C:

I. Data Processing Process on the Content Production Device Side:

(1) Acquisition of a Media Content of the Immersive Media.

In view of an acquisition method for the media content of the immersive media, it can be partitioned into two methods: a sound collected from a real world by a capture device is obtained via a visual scenario and generated by a computer. In one implementation, the capture device may refer to a hardware component provided in the content production device. For example, the capture device refers to a microphone, a camera, a sensor, and the like of a terminal. In another implementation, the capture device may also be a hardware apparatus connected to the content production device, such as a camera connected to a server, configured to provide an acquisition service of the media content of the immersive media for the content production device. The capture device may include, but is not limited to, an audio device, a camera device, and a sensing device. The audio device may include an audio sensor, a microphone, and the like. The camera device may include an ordinary camera, a stereo camera, a light field camera, and the like. The sensing device may include a laser device, a radar device, and the like. The number of capture devices can be plural, and these capture devices are deployed at some specific locations in a real space to capture audio content and video content from different angles in the space at the same time. The captured audio content and video content are both temporally and spatially synchronized. Due to the different acquisition methods, the compressed coding methods corresponding to the media content of different immersive media may also be different.

(2) Produce the Media Content of the Immersive Media.

The captured audio content itself is content suitable for performing audio coding on the immersive media. The captured video content undergoes a series of production processes before it becomes content suitable for performing video coding on the immersive media. The production process includes:

(1) Stitching. Since the captured video content is captured by the capture device at different angles, stitching can refer to stitching the video content captured at the various angles into a complete video that can reflect a 360-degree visual panorama of the real space, that is, the stitched video is a panoramic video (or spherical video) represented in a 3D space.

(2) Projection. Projection can refer to a process of mapping a 3D video formed by stitching to a 2-Dimension (2D) picture, and a 2D picture formed by projection can be referred to as a projected picture. Projection methods may include, but are not limited to: latitude and longitude projection and regular hexahedron projection.

Figure 1D:
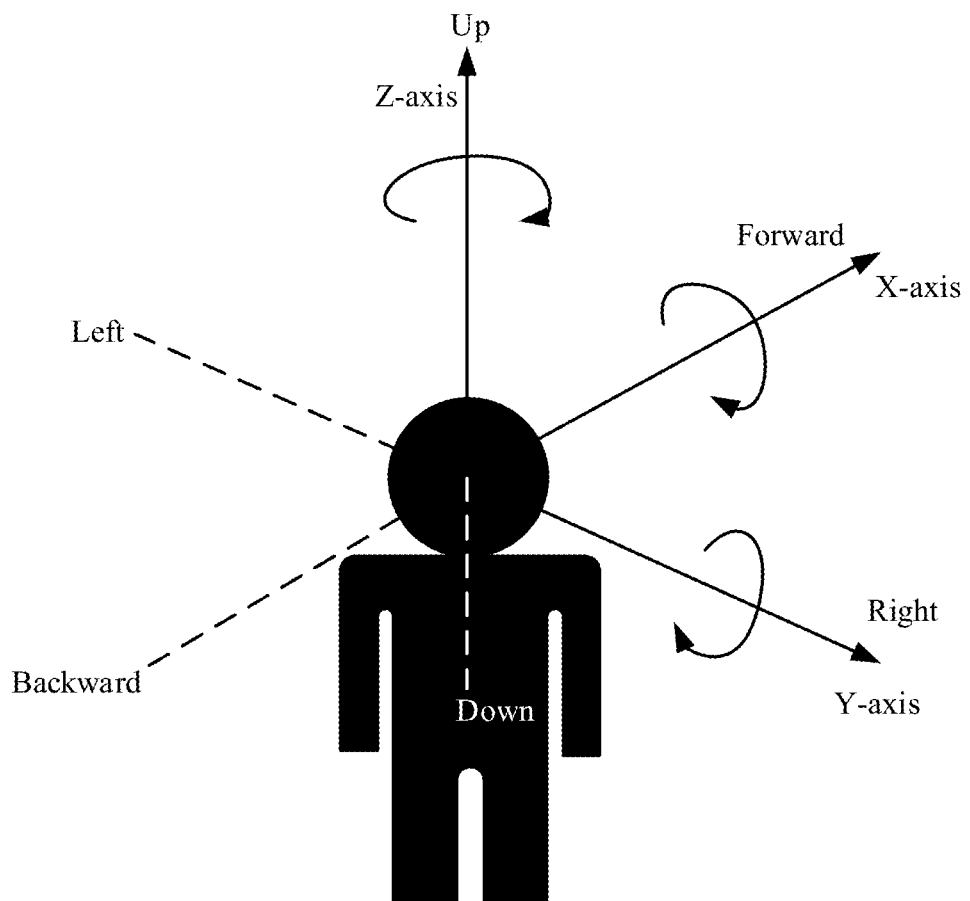
FIG. 1D illustrates a schematic diagram of 6DoF provided by an embodiment of this disclosure.
Figure 1E:
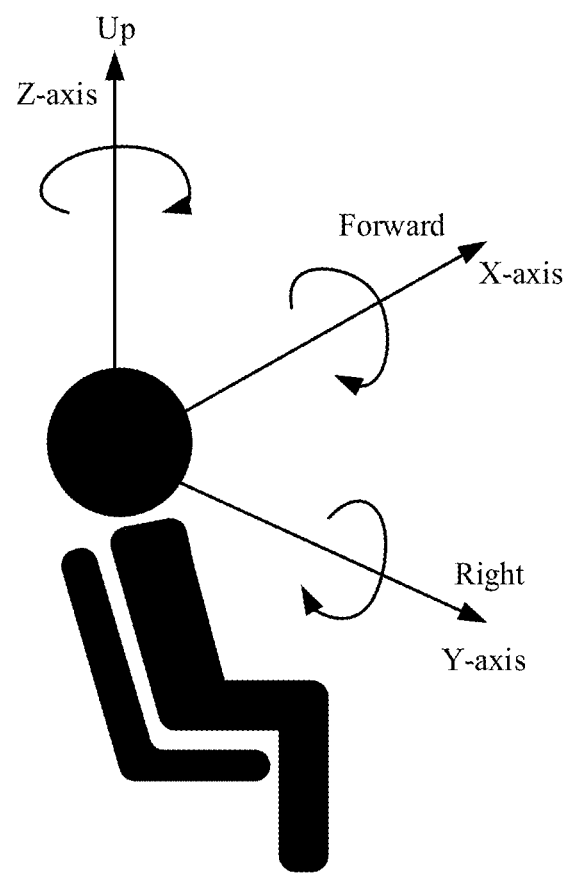
FIG. 1E illustrates a schematic diagram of 3DoF provided by an embodiment of this disclosure.
Figure 1F:
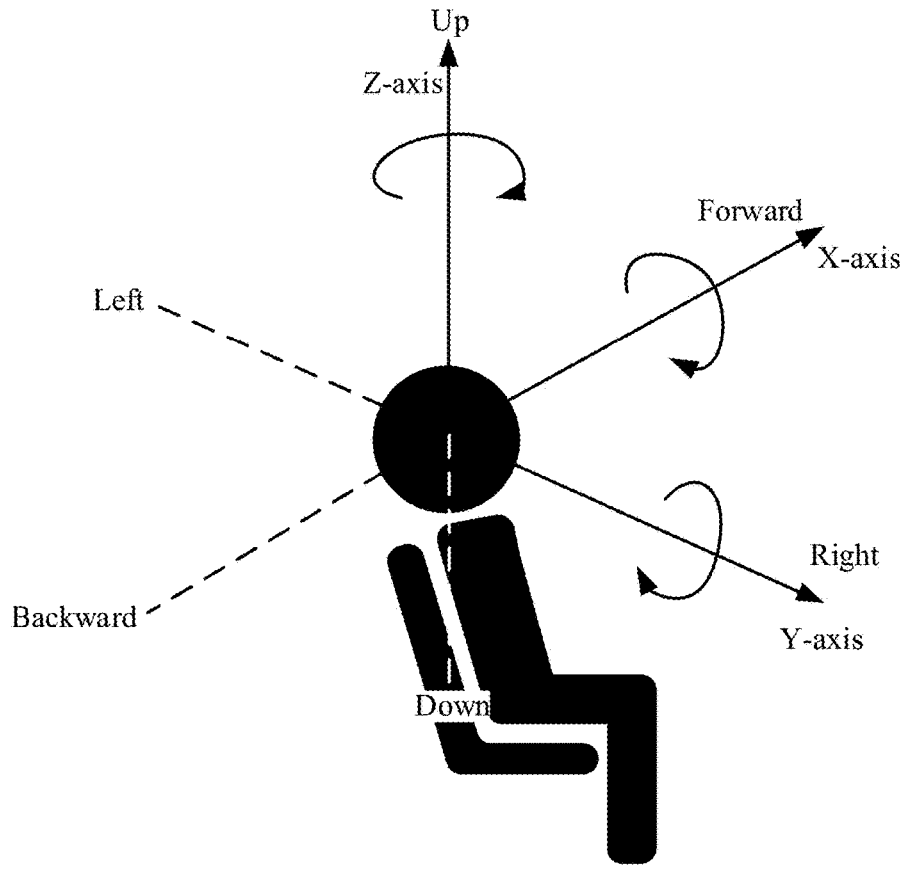
FIG. 1F illustrates a schematic diagram of 3DoF+ provided by an embodiment of this disclosure.

Since the capture device can only capture the panoramic video, after such a video is processed by the content production device and transmitted to the content playback device for corresponding data processing, a user on the content playback device side can only perform some specific actions (e.g., rotating the speed) to watch 360-degree video information, and performing non-specific actions (e.g., moving the head) cannot obtain corresponding video changes. As a result, the VR experience is not good. Therefore, additional depth information matched with the panoramic video needs to be provided to enable the user to obtain better immersion and better VR experience. This involves a variety of production techniques. Common production techniques include a 6DoF production technology. FIG. 1D illustrates a schematic diagram of 6DoF provided by an exemplary embodiment of this disclosure. The 6DoF is divided into window 6DoF, omnidirectional 6DoF, and 6DoF. The window 6DoF means that user's rotation and movement on the X-axis and Y-axis are limited, and the translation on the Z-axis is limited. For example, the user cannot see scenes beyond a window frame, and the user cannot walk through the window. The omnidirectional 6DoF means that user's rotation and movement in the X-axis, Y-axis and Z-axis are limited. For example, the user cannot freely pass through 3D 360-degree VR content in a restricted movement region. The 6DoF means that the user can freely translate along the X-axis, Y-axis, and Z-axis. For example, the user can move freely in the 3D 360-degree VR content. Similar to the 6DoF, there are also 3DoF and 3DoF+ production techniques. FIG. 1E illustrates a schematic diagram of 3DoF provided by an exemplary embodiment of this disclosure. As shown in FIG. 1E, the 3DoF means that the user is fixed at a center point of a 3D space, and the user's head rotates along the X-axis, Y-axis, and Z-axis to watch pictures provided by the media content. FIG. 1F illustrates a schematic diagram of 3DoF+ provided by an exemplary embodiment of this disclosure. As shown in FIG. 1F, 3DoF+ means that the user's head can be in a limited range on the basis of 3DoF to watch the pictures provided by the media content when a virtual scene provided by the immersive media has certain depth information.

(3) Coding Process of the Media Content of the Immersive Media

Figure 1G:
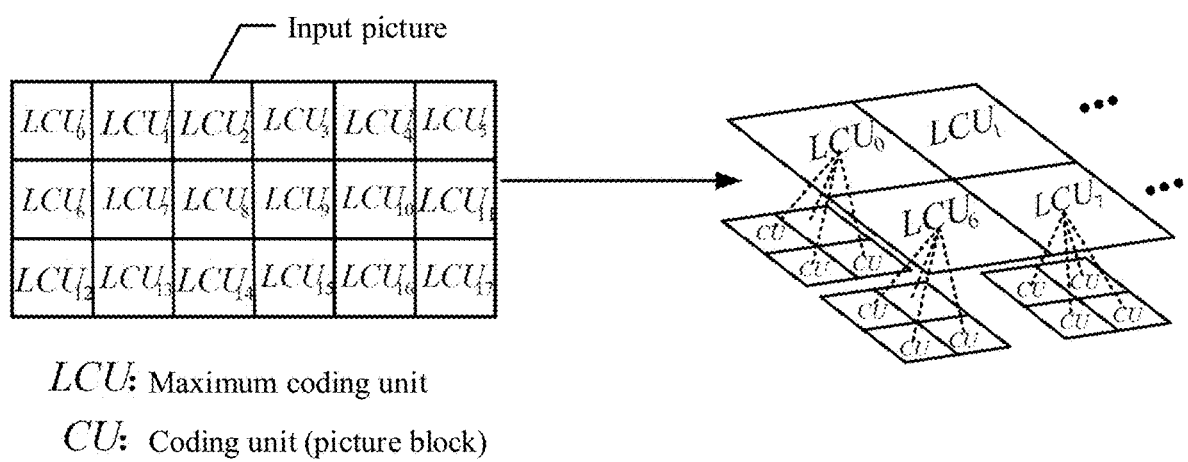
FIG. 1G illustrates a schematic diagram of division of an input picture provided by an embodiment of this disclosure.

The projected picture may be coded directly, or the projected picture can be encapsulated and then coded. The modern mainstream video coding technology, taking the high efficiency video coding (HEVC), the versatile video coding (VVC), and the audio video coding standard (AVS) as examples, adopts a hybrid coding framework to perform the following series of operations and processing on an input original video signal:

1) Block partition structure: An input picture can be partitioned into several non-overlapping processing units according to the size of a processing unit, and similar compression operations are performed on each processing unit. This processing unit can be referred to as a coding tree unit (CTU), or the largest coding unit (LCU). The CTU can continue to perform finer partitioning to obtain one or more basic coding units, which are referred to as coding units (CUs). Each CU can be the most basic element in a coding session. FIG. 1G illustrates a schematic diagram of division of an input picture provided by an embodiment of this disclosure. Various coding methods possibly adopted by each CU are described below.

2) Predictive coding: Predictive coding can include modes such as intra-frame prediction, inter-frame prediction, and the like. After the original video signal is predicted by a selected reconstructed video signal, a residual video signal is obtained. The content production device needs to select the most suitable predictive coding mode from among many possible predictive coding modes for a current CU, and inform the content playback device.

a. Intra-frame prediction: A predicted signal comes from an already coded and reconstructed region in a same picture b. Inter-frame prediction: A predicted signal comes from an already coded picture that is different from a current picture (referred to as a reference picture)

3) Transform & Quantization: The residual video signal can undergo transform operations such as discrete fourier transform (DFT), discrete cosine transform (DCT), etc., and converted to a transform domain, referred to as transform coefficients. The signal in the transform domain is further subjected to a lossy quantization operation to lose certain information, so that a quantized signal is beneficial to compressed expression. In some video coding standards, there may be more than one transform mode for selection. Therefore, the content production device also needs to select one transform for the current CU and inform the content playback device. The fineness of quantization is usually determined by a quantization parameter (QP). A larger value of QP indicates that coefficients in a larger value range will be quantized into a same output. Therefore, distortion may be larger and code rate may be lower. On the contrary, a smaller value of QP indicates that coefficients in a smaller value range will be quantized into a same output. Therefore, less distortion and a corresponding higher code rate will be usually caused.

4) Entropy coding or statistical coding: A quantized transform domain signal can undergo statistical compressed coding according to a frequency of occurrence of each value, and a binarized (0 or 1) compressed bitstream is finally output. At the same time, other information can be produced by coding, such as a selected mode and a motion vector, and entropy coding can also be required to reduce the code rate. The statistical coding is a lossless coding method that can effectively reduce the code rate required to express the same signal. Common statistical coding methods include variable length coding (VLC) or content adaptive binary arithmetic coding (CABAC).

5) Loop filtering: A coded picture can be subjected to inverse quantization, inverse transform, and predictive compensation (inverse operations of the above 2-4) to obtain a reconstructed decoded picture. Compared with the original picture, the reconstructed picture is different from the original picture due to the influence of quantization, resulting in distortion. Performing a filtering operation on the reconstructed picture, such as deblocking, sample adaptive offset (SAO) filter or adaptive loop filter (ALF), etc., can effectively reduce the distortion generated by the quantization. Since these filtered reconstructed pictures will be used as references for subsequent coded pictures to predict future signals, the above filtering operations can also be referred to as loop filtering and filtering operations in a coding loop.

If the 6DoF production technique is adopted (it is referred to as 6DoF when a user can freely move in a simulated scenario), a specific coding method (e.g., point cloud coding) needs to be used for coding in the video coding process.

(4) Encapsulation Process of the Immersive Media

An audio bitstream and a video bitstream are encapsulated in a file container according to a file format (ISO Base Media File Format (ISOBMFF)) of the immersive media to form a media file resource of immersive media. The media file resource can be a media file or media fragments form a media file of the immersive media. It is required to use, according to the file format of the immersive media, media presentation description (MPD) information to record metadata of the media file resource of the immersive media. The metadata here is a generic term of information related to presentation of the immersive media. The metadata may include description information of the media content, description information of windows, signaling information related to the presentation of the media content, and the like. As shown in FIG. 1A, the content production device will store the MPD information and the media file resource formed after the data processing process.

II. Data Processing Process on the Content Playback Device Side:

(1) File De-Encapsulation and Decoding Process of the Immersive Media

The content playback device can adaptively and dynamically obtain the media file resource of the immersive media and the corresponding MPD information from the content production device through a recommendation of the content production device or according to user's needs of the content playback device. For example, the content playback device can determine an orientation and position of the user according to tracking information of the head/eyes/body of the user and then dynamically obtain, on the basis of the determined orientation and position, the corresponding media file resource from the content production device. The media file resource and the MPD information are transmitted from the content production device to the content playback device through a transmission mechanism (e.g., DASH and SMT). The file de-encapsulation process on the content playback device side is inverse to the file encapsulation process on the content production device side. The content playback device de-encapsulates the media file resource according to the file format requirements of immersive media to obtain the audio bitstream and video bitstream. The decoding process on the content playback device side is inverse to the coding process on the content production device side. The content playback device performs audio decoding on the audio bitstream to restore the audio content. In addition, the decoding process of the video bitstream by the content playback device includes the following steps: (1) Decode the video bitstream to obtain a 2D projected picture. (2) Reconstruct the projected picture according to the MPD information to convert the picture into a 3D picture. The reconstruction processing here refers tore-projecting the 2D projected picture to the 3D space.

According to the above coding process, it can be seen that, on the content playback device side, for each CU, after the content playback device obtains the compressed bitstream, the content playback device first performs entropy decoding to obtain the various mode information and quantized transform coefficients. Each coefficient is inversely quantized and inversely transformed to obtain the residual signal. In another aspect, the predicted signal corresponding to the CU can be obtained according to the coding mode information. A reconstructed signal can be obtained after the residual signal and the predicted signal are added. Finally, a reconstructed value of the decoded picture needs to undergo the loop filtering operation to generate the final output signal.

(2) Rendering Process of the Immersive Media

The content playback device renders, according to the metadata related to rendering and window in the MPD information, the audio content obtained by audio decoding and the 3D picture obtained by video decoding, and the 3D picture is played and output after the rendering is completed. When the 3DoF and 3DoF+ production technique is adopted, the content playback device mainly renders the 3D picture on the basis of a current viewpoint, parallax, depth information, etc. When the 6DoF production technique is adopted, the content playback device mainly renders the 3D picture in the window on the basis of the current viewpoint. The viewpoint refers to a watching position of the user; the parallax refers to a sight line difference between the eyes of the user or due to a movement; and the window refers to a watching region.

The immersive media system supports a box. The box refers to a data block or object that includes metadata, that is, the box contains the metadata of the corresponding media content. The immersive media may include a plurality of boxes, including, for example, a rotation box, an overlay information box, and a media file format box.

It can be known from the above processing processes of the immersive media that after an immersive video is coded, a coded data stream needs to be encapsulated and transmitted to a user. The encapsulation technology of the related immersive media involves the concept of sub-picture frames. A plurality of sub-picture frames that belong to a same immersive media and have a same resolution are encapsulated to a same track group, while sub-picture frames that belong to a same immersive media but have different resolutions are encapsulated in different track groups. The encapsulation information is recorded using a spatial relationship 2D description box. The spatial relationship 2D description box is obtained by extending a related track group type box. According to the definition of the spatial relationship 2D description box, all tracks (tracks) containing the spatial relationship 2D description box belong to the same track group, that is, the video contents contained in these tracks are the sub-picture frames of a complete video under a same coordinate system. The track refers to a series of samples with time attributes in an encapsulation method according to the ISOBMFF, such as a video track. The video track is obtained by encapsulating, according to the specification of the ISOMFF, a bitstream generated after a video coder codes each frame.

In some embodiments, the spatial relationship 2D description box also includes a spatial relationship 2D source box used for indicating a width and height of an original video frame and a source ID of content to which it belongs, and a sub-picture region box used for indicating positions of the sub-picture frames in the entire video frame.

The syntax of the spatial relationship 2D description box of the immersive media can be seen in Table 1 below:

TABLE 1

- aligned(8) class SpatialRelationship2DSourceBox
- extends FullBox('2dss', 0, 0) {
- unsigned int(32) total_width;
- unsigned int(32) total_height;
- unsigned int(32) source_id;
- }
- aligned(8) class SubPictureRegionBox extends FullBox('sprg',0,0) {
- unsigned int(16) object_x;
- unsigned int(16) object_y;
- unsigned int(16) object_width;
- unsigned int(16) object_height;
- bit(14) reserved = 0;
- unsigned int(1) track_not_alone_flag;
- unsigned int(1) track_not_mergeable_flag;
- }

TABLE 1-continued

- aligned(8) class SpatialRelationship2DDescriptionBox extends TrackGroupTypeBox('2dsr') {
- // track_group_id is inherited from TrackGroupTypeBox;
- SpatialRelationship2DSourceBox( );  // mandatory, must be first
- SubPictureRegionBox( );     // optional
- }

The semantic of the syntax shown in above Table 1 is as follows: total_width and total_height indicates the width and height of the original video frame; source_id indicates the source ID of the complete video to which the sub-picture frame belongs; object_x and object_y indicate the coordinates of the left vertex of the sub-picture frame; object_width and object_height indicate the width and height of the sub-picture frame; track_not_alone_flag indicates whether this sub-picture frame needs to be presented simultaneously with other sub-picture frames in this track group; track not mergeable flag indicates whether the bitstream contained in the track corresponding to the sub-picture frame can be directly merged with the bitstreams contained in other sub-picture frames in the track group.

It can be seen from Table 1 above that the concept of sub-picture frames is adopted in the related art, and the encapsulation process of the sub-picture frames limits the encapsulation flexibility of the immersive media to a certain extent, and cannot be applied to various scenarios of the immersive media, such as viewing angle adaptive transmission scenarios.

Based on this, this embodiment of this disclosure extends the track group type box to obtain an independently coded region description box, so that all tracks that belong to the same immersive media (such as a same program or a same content) and spatially and have associated relationships can be defined in the same track group, that is, tracks corresponding to videos with different spatial blocks and different resolutions of the same video content belong to the same track group. Since the videos of different resolution versions may be partitioned in space separately. At this time, the segmented videos with different resolutions use different coordinate systems which are represented by a coordinate infobox. Coordinate information of each segmented video is represented by the independently coded region box. The semantics of the syntax of the independently coded region description box can refer to following Table 2:

TABLE 2

- aligned(8) class CoordianteInfoBox
- extends FullBox('2dss', 0, 0) {
- unsigned int(8) coordinate_id;
- unsigned int(32) total_width;
- unsigned int(32) total_height;
- }
- aligned(8) class IndependentlyCodedRegionBox extends FullBox('icrg',0,0) {
- unsigned int(16) region_vertex_x;
- unsigned int(16) region_vertex_y;
- unsigned int(16) region_width;
- unsigned int(16) region_height;
- bit(12) reserved = 0;
- unsigned int(1) track_not_alone_flag;
- unsigned int(1) track_not_mergeable_flag;
- unsigned int(1) track_priority_info_flag;
- unsigned int(1) track_overlap_info_flag;
- if(track_priority_info_flag == 1){
- unsigned int(8) track_priority;
- }

TABLE 2-continued

```
• if(track_overlap_info_flag == 1){
• unsigned int(1) background_flag;
•     bit(7) reserved=0;
•     if(background_flag == 1){
•         unsigned int(8) opacity;
• }
• }
• }
• aligned(8) class IndependentlyCodedRegionDescriptionBox extends
TrackGroupTypeBox('icrr') {
•     // track_group_id is inherited from TrackGroupTypeBox;
•     CoordianteInfoBox( );// mandatory, must be first
•     IndependentlyCodedRegionBox( );    // optional
• }
• class IndependentlyCodedRegionDescriptionEntry extends
VisualSampleGroupEntry('icrr') {
•     unsigned int(16) region_vertex_x;
•     unsigned int(16) region_vertex_y;
•     unsigned int(16) region_width;
•     unsigned int(16) region_height;
• }
```

The semantic of the syntax in Table 2 above are as follows (1)-(9):

(1) One independently coded region corresponds to one coordinate system identification field coordinate id. One independently coded region corresponds to one segmented video; N independently coded regions correspond to N segmented videos; and N independently coded regions correspond to N coordinate system identification fields. The coordinate system identification field of an ith independently coded region indicates the coordinate system to which an ith segmented video belongs. The segmented videos with a same resolution belong to a same coordinate system, i and N being positive integers, and i≤N.

(2) One independently coded region corresponds to a height field total_height of one complete video and a width field total_width of one complete video; N independently coded regions correspond to the height fields of N complete videos and the width fields of N complete videos. The height field of the complete video of the ith independently coded region indicates a height of the complete video under a coordinate system to which the ith segmented video belongs; the width field of the complete video of the ith independently coded region indicates a width of the complete video under the coordinate system to which the ith segmented video belongs. It is to be understood that the size of the complete video is indicated by the coordinate system identification field, the height of the complete video and the width of the complete video together.

(3) One independently coded region corresponds to an abscissa field region_vertex_x and an ordinate field region_vertex_y of a vertex of one independently coded region in the coordinate system to which it belongs, and N independently coded regions correspond to the abscissa fields and the ordinate fields of the vertex of the N independently coded regions in the coordinate system to which they belong. The abscissa field and the ordinate field of the vertex of the ith independently coded region in the coordinate system to which it belongs indicate the abscissa and ordinate of the vertex of the ith independently coded region. The independently coded region is a rectangular region, and the vertex of the independently coded region may refer to an upper left vertex, a lower left vertex, an upper right vertex, or a lower right vertex of the rectangular region.

(4) One independently coded region corresponds to a height field region_height of one independently coded region and a width field region_width of one independently coded region, and N independently coded regions correspond to the height fields of N complete videos and the width fields of N complete videos. The height field of the ith independently coded region indicates the height of the ith independently coded region; the width field of the ith independently coded region indicates the width of the ith independently coded region. The position of the ith independently coded region in the coordinate system to which it belongs is indicated by the abscissa field and ordinate field of the vertex of the independently coded region in the coordinate system to which it belongs, the height field of the independently coded region and the width field of the independently coded region together.

(5) One independently coded region corresponds to a dependently presented flag field track_not_alone_flag, and N independently coded regions correspond to N dependently presented flag fields. When the dependently presented flag field of the ith independently coded region is a valid value, it is indicated that the ith independently coded region and the independently coded regions in other tracks in the track group to which the ith independently coded region belongs are simultaneously presented; when the dependently presented flag field of the ith independently coded region is an invalid value, it is indicated that the ith independently coded region and the independently coded regions in other tracks in the track group to which the ith independently coded region belongs may not be simultaneously presented.

(6) One independently coded region corresponds to one mergeable flag field track not mergeable flag, and N independently coded regions correspond to N mergeable flag fields. When the mergeable flag field of the ith independently coded region is an invalid value, it is indicated that a bitstream contained in the track to which the ith independently coded region belongs can be merged with bitstreams contained in other tracks in the track group to which the ith independently coded region belongs; when the mergeable flag field of the ith independently coded region is a valid value, it is indicated that a bitstream contained in the track to which the ith independently coded region belongs can be merged with bitstreams contained in other tracks in the track group to which the ith independently coded region belongs.

(7) One independently coded region corresponds to one track priority information flag field track_priority info flag, and N independently coded regions correspond to N track priority information flag field. when the track priority information flag field of the ith independently coded region is an invalid value, it is indicated that priorities of all the independently coded region in the track group to which the ith independently coded region belongs are the same; and when the track priority information flag field of the ith independently coded region is a valid value, the priority of the ith independently coded region is indicated by the track priority field track_priority. A smaller value of the track priority field indicates a higher priority of the ith independently coded region. When the definition of the ith independently coded region is higher than that of a jth independently coded region, the priority of the ith independently coded region is higher than that of the jth independently coded region, j being a positive integer, j≤N, and j≠i.

(8) One independently coded region corresponds to one track overlap information flag field track_overlap_info_flag, and N independently coded regions correspond to N track overlap information flag fields. When the track overlap information flag field of the ith independently coded region is an invalid value, it is indicated that the ith independently coded region does not overlap the independently coded regions in other tracks in the track group to which the ith independently coded region belongs during its displaying. When the track overlap information flag field of the ith independently coded region is a valid value, a display method of the ith independently coded region is indicated by a background flag field background_flag. When the background flag field is an invalid value, it is indicated that the ith independently coded region is displayed as a foreground picture of the independently coded regions in other tracks in the track group to which the ith independently coded region belongs. When the background flag field is a valid value, it is indicated that the ith independently coded region is displayed as a background picture of the independently coded regions in other tracks in the track group to which the ith independently coded region belongs.

group to which the ith independently coded region belongs. When the value of the transparency field is equal to 0, the ith independently coded region is displayed as a transparent background picture. When the value of the transparency field is greater than 0, the ith independently coded region is displayed as a non-transparent background picture.

Description information corresponding to the independently coded region description box is stored in an independently coded region description signaling file provided by this embodiment of this disclosure, and the independently coded region description signaling file is encapsulated in an adaptation set in a media presentation description file of the immersive media. The independently coded region description signaling file is to contain elements and attributes defined in Table 3 below.

TABLE 3

| Elements and attributes | Usage | Data type | Description |
| --- | --- | --- | --- |
| IndependentlyCodedRegionGroupId | 0 . . . N | xs: unsignedShort | In a case that one or more representations in an AdaptationSet correspond to the tracks carrying the independently coded regions belonging to the same track group, the independently coded region track group ID corresponding to the AdaptationSet is identified by this field. |
| IndependentlyCodedRegionGroupId@coordinateId | 0 . . . N | xs: unsignedByte | In a case that the independently coded regions correspondingly carried by one or more representations in one AdaptationSet belong to a same coordinate system during spatially combination, the independently coded region coordinate ID corresponding to the AdaptationSet is identified by this field. |
| IndependentlyCodedRegionGroupId@trackPriority | Optional | xs: unsignedByte | Indicate the priority of the independently coded region correspondingly carried by one or more representations in the AdaptationSet. A smaller value of the field indicates a higher priority of the independently coded region. |
| IndependentlyCodedRegionGroupId@backgroundFlag | Optional | xs: boolean | Indicate whether the independently coded region carried by one or more representations in the AdaptationSet is presented as a background during presentation. In a case that the value of this field is 0 or this field is not contained, it is indicated that the corresponding independently coded region is presented as a foreground. In a case that the value of this field is 1, it is indicated that the corresponding independently coded region is presented as a background. |

(9) When the ith independently coded region is displayed as the background picture of the independently coded regions in other tracks in the track group to which the ith independently coded region belongs, a transparency field opacity of the ith independently coded region indicates the transparency during displaying the background picture of the independently coded regions in other tracks in the track As can be seen from above Table 3, the independently coded region description signaling file in this embodiment of this disclosure includes elements and attributes: IndependentlyCodedRegionGroupId, IndependentlyCodedRegion GroupId@coordinateId, IndependentlyCodedRegion Group Id@trackPriority, and IndependentlyCodedRegion Group Id@backgroundFlag and related descriptions of these elements and attributes.

According to the independently coded region description box shown in Table 2 of this embodiment of this disclosure, in combination with the independently coded region description signaling file shown in Table 3, the content production device stores tracks of a plurality of segmented videos in the same video to the same track group and can support more current mainstream viewing angle adaptive transmission technology of the immersive media, so that the video transmission process is more reliable. At the same time, unnecessary internal memory overhead caused by the storage of different versions of videos by the content production device is also avoided. By generating the corresponding independently coded region description box, the content playback device can more conveniently present the immersive media.

FIG. 2 illustrates a flow chart of a data processing method for an immersive media system provided by an embodiment of this disclosure. The method may be implemented by the content production device or the content playback device in the immersive media system. The method includes following steps S201-S202:

In step S201, acquire an independently coded region description box of an ith independently coded region of an immersive media, the ith independently coded region corresponding to an ith segmented video; the independently coded region description box including an independently coded region box and a coordinate infobox, i and N being positive integers, and i≤N. For example, independently coded region description information of an independently coded region of the immersive media is acquired, the independently coded region corresponding to a segmented video of a plurality of segmented videos encapsulated in tracks of a same track group, the independently coded region description information including an independently coded region information and coordinate information, the coordinate information including coordinate system identification information that indicates a coordinate system of the independently coded region.

The immersive media includes N segmented videos; the N segmented videos are respectively encapsulated to N tracks; an ith segmented video is encapsulated in an ith track; the N tracks belong to a same track group.

In step S202, display the ith segmented video of the immersive media according to the independently coded region description box. For example, the segmented video of the immersive media is displayed according to the independently coded region description information.

In step S201-S202, the syntax of the independently coded region description box of the immersive media may refer to Table 2. The coordinate infobox is used for indicating the coordinate systems used by the segmented videos with different resolutions, that is, the value of each field in the coordinate infobox is configured according to the coordinate systems used by the segmented videos with different resolutions after the immersive media is partitioned. For example, the coordinate system used by segmented video 1 to segmented video 6 with a resolution of 4K (4096×2160 pixels) is coordinate system 1, and the coordinate system used by segmented video 7 to segmented video 12 with a resolution of 2K is coordinate system 2. The independently coded region box is used for indicating the coordinate information (e.g., the size of the segmented video and its position in the coordinate system to which it belongs) of each segmented video and a display method of each segmented video in the immersive media. The display method may include, but is not limited to: whether to display the video independently, whether the video overlaps other segmented videos during displaying, the transparency of the segmented video during displaying.

For the content production device, an independently coded region description signaling file can also be generated according to the encapsulation process of the N segmented videos of the immersive media. The independently coded region description signaling file includes description information of the independently coded region description box. The syntax of the independently coded region description signaling file may refer to Table 3.

Before acquiring a packed file of the immersive media, the content playback device may first acquire a media presentation description file of the immersive media and then acquire the independently coded region description signaling file from an adaptation set in the media presentation description file. The content playback device requests the content production device for the packed file corresponding to the immersive media according to a need of a user (such as a current viewing angle of the user) and the independently coded region description signaling file.

In this embodiment of this disclosure, N segmented videos (having a same resolution or different resolutions) belonging to a same immersive media are encapsulated to N track groups, and the N track groups are encapsulated to a same track group; at the same time, the concept of the independently coded region corresponding to all the segmented videos is introduced; the consumption relationship between an ith track and other tracks in the track group is indicated through the independently coded region description box of the ith independently coded region; and a more convenient and accurate presentation effect can be achieved during displaying, according to the independently coded region description box of the ith independently coded region, the ith independently coded region.

FIG. 3 illustrates a flow chart of another data processing method for an immersive media system provided by an embodiment of this disclosure. The method may be implemented by the content production device in the immersive media system. The method includes following steps S301-S303:

In step S301, partition an immersive media into N segmented videos. For example, an immersive media is partitioned into a plurality of segmented videos.

The basis for partitioning includes at least one of the following: space, viewing angle, resolution, and the like. For example, the immersive media is partitioned into four regions: a front region, a rear region, a left region, and a right region according to a viewing angle of the user, and the regions corresponding to different viewing angles are then further partitioned according to a partition rule (e.g., a preset size of an independently coded region, or the number of independently coded regions), thus obtaining N segmented videos.

In step S302, respectively encapsulate the N segmented videos into N tracks, an ith segmented video being encapsulated in an ith track; the ith segmented video corresponding to an ith independently coded region, and i and N being positive integers, and i≤N; and the N tracks belonging to a same track group. For example, the plurality of segmented videos is encapsulated into respective tracks in a same track group, a segmented video of the plurality of segmented videos corresponding to an independently coded region.

In an implementation, resolutions of the segmented videos in all the tracks in the track group are the same.

In another implementation, the resolution of the segmented video in the ith track in the track group is different from that of the segmented video in a jth track, j being a positive integer, j≤N, and j≠i. That is, tracks corresponding to different spatial blocks and videos with different resolutions of a same video content are stored in the same track group.

In step S303, generate an independently coded region description box of the ith independently coded region according to an encapsulation process of the ith segmented video, the independently coded region description box including an independently coded region box and a coordinate infobox. For example. independently coded region description information of the independently coded region is generated according to the encapsulation of the segmented video, the independently coded region description information including independently coded region information and coordinate information, the coordinate information including coordinate system identification information that indicates a coordinate system of the independently coded region.

With reference to Table 2, the process of generating the independently coded region description box of the ith independently coded region in step S303 may include the following (1)-(8):

(1) The coordinate infobox includes a coordinate system identification field coordinate_id. One independently coded region corresponds to one coordinate system identification field. A coordinate system to which the ith independently coded region belongs is determined according to the resolution of the ith segmented video, and a value of the coordinate system identification field of the ith independently coded region is configured according to the identification of the coordinate system. When the resolution of the ith segmented video is the same as that of the jth segmented video of the immersive media, the ith independently coded region and the jth independently coded region belong to the same coordinate system, j being a positive Integer, j≤N, and j (2) The coordinate infobox includes a height field total_height of a complete video and a width field total_width of the complete video, and one independently coded region corresponds to the height field of one complete video and the width field of one complete video. The complete video includes segmented videos corresponding to all the independently coded regions under the coordinate system to which the ith independently coded region belongs. The height and width of the complete video composed of the segmented videos corresponding to all the independently coded regions under the coordinate system to which the ith independently coded region belongs are acquired. The obtained height of the complete video is configured as the value of the height field of the complete video, and the obtained width of the complete video is configured as the value of the width field of the complete video.

(3) The independently coded region box includes an abscissa field region_vertex_x and an ordinate field region_vertex_y of the independently coded region, and one independently coded region corresponds to one abscissa field and one ordinate field. The value of the abscissa and the value of the ordinate of a vertex of the ith independently coded region in the coordinate system to which it belongs are acquired; the acquired value of the abscissa of the ith independently coded region in the coordinate system to which it belongs is configured as the value of the abscissa field of the ith independently coded region in the coordinate system to which it belongs; and the acquired value of the ordinate of the ith independently coded region in the coordinate system to which it belongs is configured as the value of the ordinate field of the ith independently coded region in the coordinate system to which it belongs. The independently coded region is a rectangular region, and the vertex of the independently coded region may refer to an upper left vertex, a lower left vertex, an upper right vertex, or a lower right vertex of the rectangular region.

(4) The independently coded region box includes a height field region_height of an independently coded region and a width field region_width of the independently coded region, and one independently coded region corresponds to the height field of one independently coded region and the width field of one independently coded region. The height and width of the ith independently coded region are acquired; the acquired height of the ith independently coded region is configured as the value of the height field of the ith independently coded region; and the acquired width of the ith independently coded region is configured as the value of the width field of the ith independently coded region.

(5) The independently coded region box includes a dependently presented flag field track_not_alone_flag of an independently coded region, and one independently coded region corresponds to one dependently presented flag field. When the ith independently coded region is presented simultaneously with independently coded regions in other tracks in the track group to which the ith independently coded region belongs, the dependently presented flag field of the ith independently coded region is configured as a valid value; when the ith independently coded region is not presented simultaneously with the independently coded regions in other tracks in the track group to which the ith independently coded region belongs, the dependently presented flag field of the ith independently coded region is configured as an invalid value.

(6) The independently coded region box includes a mergeable flag field track_not_mergeable_flag of an independently coded region, and one independently coded region corresponds to one mergeable flag field. When a bitstream contained in the track to which the ith independently coded region belongs can be directly merged with bitstreams contained in other tracks in the track group to which the ith independently coded region belongs (that is, inter-track coding methods are the same), the mergeable flag field of the ith independently coded regions is configured as an invalid value; when the bitstream contained in the track to which the ith independently coded region belongs cannot be directly merged with the bitstreams contained in other tracks in the track group to which the ith independently coded region belongs (i.e., inter-track coding methods are different), the mergeable flag field of the ith independently coded regions is configured as a valid value.

(7) The independently coded region box includes a track priority information flag field track_priority_info_flag of the independently coded region, and one independently coded region corresponds to one track priority information flag field. When priorities of all independently coded regions in the track group to which the ith independently coded region belongs are the same, the track priority information flag field of the ith independently coded region is configured as an invalid value. When the priorities of all the independently coded regions in the track group to which the ith independently coded region belongs are different, the track priority information flag field of the ith independently coded region is configured as a valid value. When the priorities of all the independently coded regions in the track group to which the ith independently coded region belongs are different, the independently coded region box further includes a track priority field track_priority of the ith independently coded region. The priority of the ith independently coded region is determined by at least one of the following: the resolution of the ith independently coded region, the presentation priority of the track to which the ith independently coded region belongs, and a transmission priority of the track to which the ith independently coded region belongs. The priority of the ith independently coded region is configured as the track priority field of the ith independently coded region.

In an implementation, a higher resolution of the ith independently coded region indicates a smaller value of the configured track priority field of the ith independently coded region. Similarly, a higher presentation priority of the track to which the ith independently coded region belongs indicates a smaller value of the configured track priority field of the ith independently coded region. A higher transmission priority of the track to which the ith independently coded region belongs indicates a smaller value of the configured track priority field of the ith independently coded region.

(8) The independently coded region box includes a track overlap information flag field track_overlap_info_flag of an independently coded region, and one independently coded region corresponds to one track overlap information flag field. When the ith independently coded region and the independently coded regions in other tracks in the track group to which the ith independently coded region belongs are not displayed in an overlapping manner, the track overlap information flag field of the ith independently coded region is configured as an invalid value. When the ith independently coded region is required to be displayed in an overlapping manner with the jth independently coded region in the track group to which the ith independently coded region belongs, the track overlap information flag field of the ith independently coded region is configured as a valid value, j being a positive integer, and j≠i. When the ith independently coded region and the jth independently coded region in the track group to which the ith independently coded region belongs are displayed in the overlapping manner, the independently coded region box further includes a background flag field background_flag of the ith independently coded region. When the ith independently coded region is required to be displayed as a foreground picture of the jth independently coded region in the track group to which the ith independently coded region belongs, the background flag field of the ith independently coded region is configured as an invalid value. When the ith independently coded region is required to be displayed as a background picture of the jth independently coded region in the track group to which the ith independently coded region belongs, the background flag field of the ith independently coded region is configured as a valid value. When the ith independently coded region is displayed as the background picture of the jth independently coded region in the track group to which the ith independently coded region belongs, the independently coded region box further includes a transparency field opacity of the ith independently coded region. When the ith independently coded region is required to be displayed as a transparent background picture, the value of the transparency field of the ith independently coded region is configured as 0. When the ith independently coded region is required to be displayed as a non-transparent background picture, the value of the transparency field of the ith independently coded region is configured according to the transparency of the ith independently coded region, and the value of the transparency field of the ith independently coded region is greater than or equal to 0. Two different independently coded regions presented as the foreground pictures cannot overlap with each other.

In addition, an independently coded region description signaling file can also be generated according to the encapsulation process of the N segmented videos of the immersive media. The independently coded region description signaling file includes description information of the independently coded region description box. The syntax of the independently coded region description signaling file may refer to Table 3. The configuration methods for all the fields in the independently coded region description signaling file may refer to the configuration methods of the corresponding fields in the above independently coded region description box and will not be repeated here.

For example, as shown in FIG. 4A, the content production device partitions the immersive media into 6 segmented videos, and encapsulates segmented video bitstream 1 to segmented video bitstream 6 to track 1 to track 6 respectively. Since the segmented videos in track 1 to track 6 are different segmented videos belonging to the same video content, track 1 to track 6 belong to the same track group. Assuming that the track group identification is 1, track group id=1 is configured. Furthermore, since the segmented videos corresponding to track 1 to track 6 belong to the same resolution, track 1 to track 6 share one coordinate system. Assuming that the value of the coordinate system ID is 1, coordinate_id=1 is configured. Assuming that the width and height of a complete video frame are 600 and 200 respectively, total_width=600 and total_height=200 are configured. Thus, the coordinate infoboxes of track 1 to track 6 are obtained. Assuming that an origin (0,0) of all the coordinate systems is the upper left corner of the video frame, the x-axis is from left to right, and the y-axis is from top to bottom. The coordinates of the upper left vertices of all the independently coded regions in the independently coded region box corresponding to the independently coded regions in track 1 to track 6 are: (0,0), (200,0), (400,0), (0, 100), (200, 100), (400, 100), and the width and height of the independently coded region are 200 and 100 respectively, that is, region_height=100, region_width=200. Since track 1 to track 6 have the same resolution and are all foreground pictures, the values of track_priority_info_flag and track_overlap_info_flag are both 0. The content production device sends the independently coded region description signaling file to the user, IndependentlyCodedRegionGroupId being configured as 1; IndependentlyCodedRegionGroupId@coordinateId being configured as 1. Since track 1 to track 6 have the same resolution and the same priority, and are presented as foregrounds, neither IndependentlyCodedRegionGroupId@trackPriority nor IndependentlyCodedRegionGroupId@backgroundFlag is contained in the independently coded region description signaling file. The content playback device requests the content production device for video files corresponding to track 2 and track 5 according to the viewing angle of the user and the size of a visual field of the content playback device for one-time consumption. The content production device packs track 2 and track 5 into a packed file of the immersive media, and transmits it to the content playback device. The track of the file contains the above coordinate infobox and the independently coded region box.

In another example, as shown in FIG. 4B, the content production device partitions the immersive media into 12 segmented videos. Segmented video bitstream 1 to segmented video bitstream 6 of a high-resolution (Resolution 1) video are encapsulated in tracks 1 to 6, and segmented video bitstream 1 to segmented video bitstream 6 of a low-resolution (Resolution 2) video are encapsulated in tracks 7 to 12. Since track 1 to track 12 belong to different segments of the same video content, track 1 to track 12 belong to the same track group. Assuming that the track group identification is 1, track group id=1 is configured. Furthermore, since the segmented videos corresponding to track 1 to track 6 belong to the same resolution, track 1 to track 6 share one coordinate system. Assuming that the value of the coordinate system ID is 1, coordinate_id=1 is configured. Similarly, track 7 to track 12 correspond to another coordinate system. Assuming that the value of the coordinate system ID is 2, coordinate_id=2 is configured. Assuming that the width and height of a complete video frame are 600 and 200 respectively, total_width=600 and total_height=200 are configured. Thus, the coordinate infoboxes of track 1 to track 6 are obtained. Assuming that the width and height of the low-resolution complete video frame are 300 and 100, coordinate system 2 corresponds to total_width=300 and total_height=100. Thus, the coordinate infoboxes of track 7 to track 12 are obtained. It can be seen that the coordinate infoboxes of track 1 to track 6 are the same, and the coordinate infoboxes of track 7 to track 12 are the same. Assuming that an origin (0,0) of all the coordinate systems is the upper left corner of the video frame, the x-axis is from left to right, and the y-axis is from top to bottom. The coordinates of the upper left vertices of all the independently coded regions in the independently coded region box corresponding to the independently coded regions in track 1 to track 6 are: (0,0), (200,0), (400,0), (0, 100), (200, 100), (400, 100), and the width and height of the independently coded region are 200 and 100 respectively, that is, region_height=100, region_width=200. The coordinates of the upper left vertices of all the independently coded regions in the independently coded region box corresponding to the independently coded regions in track 7 to track 12 are: (0,0), (100,0), (200,0), (0, 50), (100, 50), (200, 50), and the width and height of the independently coded region are 100 and 50 respectively, that is, region_height=50, region_width=100. The content production device sends the independently coded region description signaling file to the user. In an adaptation set corresponding to the high-resolution (Resolution1) video: the value of IndependentlyCodedRegionGroupId is 1; the value of IndependentlyCoded Region GroupId@coordinateId is 1; the value of IndependentlyCodedRegionGroupId@trackPriority is 0; IndependentlyCodedRegionGroupId@backgroundFlag is not contained in the independently coded region description signaling file. In the adaptation set corresponding to the low-resolution (Resolution2) video: the value of IndependentlyCoded Region GroupId is 1; the value of IndependentlyCodedRegionGroupId@coordinateId is 2; the value of IndependentlyCodedRegionGroupId@trackPriority is 1; the value of IndependentlyCodedRegionGroupId@backgroundFlag is 1. According to the viewing angle of the user and the size of the visual field of the content playback device for one-time consumption, the content playback device requests the content production device for video files corresponding to track 2, track 5, and track 7 and track 10. The content production device packs track 2, track 5, track 7, and track 10 into a packed file of the immersive media, and transmits it to the content playback device. At this time, since the packed file contains two videos with different resolutions, and the low-resolution independently coded region is presented as a background of the high-resolution independently coded region: since the resolution of the complete video corresponding to track 1 to track 6 is higher, the value of track_priority_info_flag is 1; the values of track_priority corresponding to track 1 to track 6 are smaller and the same, which is assumed to be 0; and the values of track_priority corresponding to track 7 to track 12 are larger, which is assumed to be 1. Since the high-resolution independently coded region may overlap with the low-resolution independently coded region, the values of track_overlap_info_flag of track 1 to track 12 are all 1. Track 1 to track 6 are presented as foreground pictures, so the value of background_flag is 0. Track 7 to track 12 are presented as background pictures, so the value of background_flag is 1. Assuming that the transparency of the overlapping part is 100%, the value of opacity is 0. The track of the file contains the above coordinate infobox and the independently coded region box.

In this embodiment of this disclosure, N segmented videos (having a same resolution or different resolutions) belonging to a same immersive media are encapsulated to N track groups, and the N track groups are encapsulated to a same track group. In this way, this embodiment can be applicable to more transmission scenarios, for example, a viewing angle adaptive transmission scenario of the immersive media; furthermore, the transmission process of the immersive media is more reliable, and unnecessary internal memory overhead caused by storage different versions of videos in a content production device. Meanwhile, the concept of the independently coded region corresponding to all the segmented videos is introduced; the independently coded region description box of the ith independently coded region is generated according to the encapsulation process of the ith segmented video; and the consumption relationship between an ith track and other tracks in the track group is indicated through the independently coded region description box of the ith independently coded region. A content consumption device side can display the ith independently coded region according to the independently coded region description box of the ith independently coded region when the independently coded region description box is transmitted to the content consumption device side, so that a more convenient and accurate presentation effect can be achieved.

FIG. 5 illustrates a flow chart of another data processing method for an immersive media provided by an embodiment of this disclosure. The method may be implemented by the content playback device in the immersive media system. The method includes following steps S501-S503:

In step S501, acquire a packed file of an immersive media, the immersive media including N segmented videos, the N segmented videos being encapsulated to N tracks, and an ith segmented video being encapsulated in an ith track; the N tracks belonging to a same track group; the ith segmented video corresponding to an ith independently coded region; the packed file at least including the ith track, the ith track including an independently coded region description box of the ith independently coded region, i and N being positive integers, and i≤N.

The packed file of the immersive media is obtained by encapsulating and packing one or more tracks in the same track group. In an implementation, a packing policy for the packed file is preset by a content producer of the immersive media (e.g., according to a scenario of the immersive media). In another implementation, the packing policy for the packed file is dynamically set according to a request of the content playback device (e.g., according to different user's viewing angles).

In step S502, de-encapsulate the packed file to obtain the independently coded region description box of the ith independently coded region, the independently coded region description box including an independently coded region box and a coordinate infobox.

The content playback device de-encapsulates the packed file to obtain the one or more tracks in the packed file and the independently coded region description box corresponding to all the tracks.

In step S503, display the ith segmented video of the immersive media according to the independently coded region description box.

With reference to above Table 2, the process in step S503 of displaying the ith segmented video of the immersive media according to the independently coded region description box may include the following (1)-(8):

(1) The coordinate infobox includes a coordinate system identification field coordinate_id; one independently coded region corresponds to one coordinate system identification field; and a coordinate system to which the ith independently coded region belongs is determined according to the coordinate system identification field of the ith independently coded region. When the resolution of the ith segmented video is the same as that of the jth segmented video of the immersive media, the ith independently coded region and the jth independently coded region belong to the same coordinate system, j being a positive Integer, j≤N, and j≠i.

(2) The coordinate infobox includes a height field total_height of a complete video and a width field total_width of the complete video; one independently coded region corresponds to the height field of one complete video and the width field of one complete video; and one independently coded region corresponds to one segmented video. The complete video is composed of segmented videos corresponding to all the independently coded regions under the coordinate system to which the ith independently coded region belongs. The size of the complete video under the coordinate system to which the ith segmented video belongs is determined according to the height field and width field of the complete video under the coordinate system to which the ith segmented video belongs.

(3) The independently coded region box includes an abscissa field region_vertex_x and an ordinate field region_vertex_y of the independently coded region, and one independently coded region corresponds to one abscissa field and one ordinate field. Coordinates of a vertex of the ith independently coded region in the coordinate system to which the ith independently coded region belongs is determined according to the abscissa field and ordinate field of the ith independently coded region. The independently coded region is a rectangular region, and the vertex of the independently coded region may refer to an upper left vertex, a lower left vertex, an upper right vertex, or a lower right vertex of the rectangular region.

(4) The independently coded region box includes a height field region_height of an independently coded region and a width field region_width of the independently coded region, and one independently coded region corresponds to the height field of one independently coded region and the width field of one independently coded region. A size of the ith independently coded region is determined according to the width field and width field of the ith independently coded region.

(5) The independently coded region box includes a dependently presented flag field track_not_alone_flag of an independently coded region, and one independently coded region corresponds to one dependently presented flag field. When the dependently presented flag field of the ith independently coded region is a valid value, the ith independently coded region and the independently coded regions in other tracks in the track group to which the ith independently coded region belongs are simultaneously presented. When the dependently presented flag field of the ith independently coded region is an invalid value, the ith independently coded region and the independently coded regions in other tracks in the track group to which the ith independently coded region belongs may not be simultaneously presented.

(6) The independently coded region box includes a mergeable flag field track_not_mergeable_flag of an independently coded region, and one independently coded region corresponds to one mergeable flag field. When the mergeable flag field of the ith independently coded region is an invalid value, a bitstream contained in the track to which the ith independently coded region belongs can be directly merged with bitstreams contained in other tracks in the track group to which the ith independently coded region belongs. When the mergeable flag field of the ith independently coded region is a valid value, a bitstream contained in the track to which the ith independently coded region belongs cannot be directly merged with bitstreams contained in other tracks in the track group to which the ith independently coded region belongs.

(7) The independently coded region box includes a track priority information flag field track_priority_info_flag of the independently coded region, and one independently coded region corresponds to one track priority information flag field. When the track priority information flag field of the ith independently coded region is an invalid value, priorities of all the independently coded region in the track group to which the ith independently coded region belongs are the same. When the track priority information flag field of the ith independently coded region is a valid value, the independently coded region box further includes a track priority field track_priority of the ith independently coded region. The resolution of the ith independently coded region, the presentation priority of the track to which the ith independently coded region belongs, and a transmission priority of the track to which the ith independently coded region belongs are determined according to the track priority field of the ith independently coded region.

In an implementation, a smaller value of the track priority field of the ith independently coded region indicates a higher resolution of the ith independently coded region. Similarly, a smaller value of the track priority field of the ith independently coded region indicates a higher presentation priority of the track to which the ith independently coded region belongs. A smaller value of the track priority field of the ith independently coded region indicates a higher transmission priority of the track to which the ith independently coded region belongs.

(8) The independently coded region box includes a track overlap information flag field track_overlap_info_flag of an independently coded region, and one independently coded region corresponds to one track overlap information flag field. When the track overlap information flag field of the ith independently coded region is an invalid value, the ith independently coded region does not overlap the independently coded regions in other tracks in the track group to which the ith independently coded region belongs during its displaying. When the track overlap information flag field of the ith independently coded region is a valid value, the ith independently coded region and a jth independently coded region in the track group to which the ith independently coded region belongs are displayed in an overlapping manner, j being a positive integer, and j≠i. When the track overlap information flag field of the ith independently coded region is a valid value, the independently coded region box further includes a background flag field background_flag of the ith independently coded region. When the background flag field of the ith independently coded region is an invalid value, the ith independently coded region is displayed as a foreground picture of the jth independently coded regions in the track group to which the ith independently coded region belongs. When the background flag field of the ith independently coded region is a valid value, the ith independently coded region is displayed as a background picture of the jth independently coded regions in the track group to which the ith independently coded region belongs. When the background flag field of the ith independently coded region is a valid value, the independently coded region box further includes a transparency field opacity of the ith independently coded region. When the value of the transparency field of the ith independently coded region is 0, the ith independently coded region is displayed as a transparent background picture. When the value of the transparency field of the ith independently coded region is greater than 0, the ith independently coded region is displayed as a non-transparent background picture, and the transparency of the ith independently coded region is decided on the basis of the value of the transparency field of the ith independently coded region. Two different independently coded regions presented as the foreground pictures cannot overlap with each other.

In an implementation, a value range of the transparency field of the ith independently coded region is [0, 100]; the value of 0 indicates that the background picture is completely transparent; the value of 100 indicates that the background picture is completely non-transparent; and values greater than 100 are reserved.

In addition, before acquiring an encapsulated file of the immersive media, the content playback device may first acquire an MPD file of the immersive media and then acquire an independently coded region description signaling file from an adaptation set in a media presentation description file. The content playback device requests the content production device for the packed file corresponding to the immersive media according to a need of a user (e.g., a current viewing angle of the user) and the independently coded region description signaling file, and displays, according to above steps (1)-(8), the immersive media.

For example, as shown in FIG. 4A, the content playback device de-encapsulates the received packed file of the immersive media. Since both track 2 and track 5 belong to the same track group, and the type of the track group is 'icrr'. The content playback device learns that contents contained in track 2 and track 5 are two independently coded regions. After decoding track 2 and track 5 respectively, the content playback device presents and consumes the video content according to the coordinate information in the independently coded region description box.

In another example, as shown in FIG. 4B, the content playback device de-encapsulates the received packed file of the immersive media. Since track 2, track 5, track 7, and track 10 all belong to the same track group, and the type of the track group is 'icrr', a client learns that contents contained in track 2, track 5, track 7, and track 10 are four independently coded regions. Furthermore, track 2 and track 5 belongs to the same coordinate system, and track 7 and track 10 belong to another coordinate system. Since the values of background_flag of track 2 and track 5 are 0, they are presented as foreground pictures. Correspondingly, track 7 and track 10 are presented as background pictures. After decoding track 2, track 5, track 7, and track 10 respectively, the content playback device presents and consumes the video content according to the coordinate information in the independently coded region description box.

In this embodiment of this disclosure, N segmented videos (having a same resolution or different resolutions) belonging to a same immersive media are encapsulated to N track groups, and the N track groups are encapsulated to a same track group; at the same time, the concept of the independently coded region corresponding to all the segmented videos is introduced; the consumption relationship between an ith track and other tracks in the track group is indicated through the independently coded region description box of the ith independently coded region; and a more convenient and accurate presentation effect can be achieved during displaying, according to the independently coded region description box of the ith independently coded region, the ith independently coded region.

The methods of this embodiment of this disclosure are described in detail above. In order to facilitate better implementation of the above solutions of the embodiments of this disclosure apparatuses of the embodiments of this disclosure are provided below.

Figure 6:
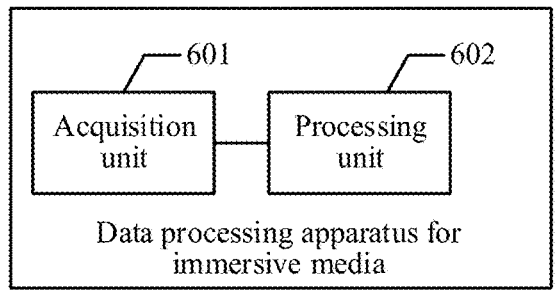
FIG. 6 illustrates a schematic structural diagram of a data processing apparatus for an immersive media provided by an embodiment of this disclosure.

Referring to FIG. 6, FIG. 6 illustrates a schematic structural diagram of a data processing apparatus for an immersive media provided by an embodiment of this disclosure. The data processing apparatus for an immersive media may be a computer program (including a program code) running in the content production device. For example, the data processing apparatus for an immersive media may be application software in the content production device. As shown in FIG. 6, the data processing apparatus for an immersive media includes an acquisition unit 601 and a processing unit 602. One or more modules, submodules, and/or units of the apparatus can be implemented by processing circuitry, software, or a combination thereof, for example.

In one exemplary embodiment, the immersive media includes N segmented videos; the N segmented videos are respectively encapsulated to N tracks; an ith segmented video is encapsulated in an ith track; the N tracks belong to a same track group; the data processing apparatus for an immersive media may be used for implementing the corresponding steps in the method shown in FIG. 2:

The acquisition unit 601 is configured to acquire an independently coded region description box of an ith independently coded region of an immersive media, the ith independently coded region corresponding to an ith segmented video; and the independently coded region description box includes an independently coded region box and a coordinate infobox, i and N being positive integers, and i≤N.

The processing unit 602 is configured to display the ith segmented video of the immersive media according to the independently coded region description box.

In an implementation, the acquisition unit 601 is further configured to acquire an independently coded region description signaling file, the independently coded region description signaling file being encapsulated in an adaptation set in a media presentation description file of the immersive media The independently coded region description signaling file includes description information of the independently coded region description box of the ith independently coded region.

In another exemplary embodiment, the data processing apparatus for an immersive media may be used for implementing the corresponding steps in the method shown in FIG. 3:

The processing unit 602 is configured to partition an immersive media into N segmented videos. The processing unit 602 is configured to respectively encapsulate the N segmented videos into N tracks, an ith segmented video being encapsulated in an ith track; the ith segmented video corresponding to an ith independently coded region, i and N being positive integers, and i N; and the N tracks belonging to a same track group. The processing unit 602 is configured to generate, according to the encapsulation process of the ith segmented video, an independently coded region description box of the ith independently coded region, the independently coded region description box including an independently coded region box and a coordinate infobox.

In an implementation, the coordinate infobox includes a coordinate system identification field of the ith independently coded region. The processing unit 602 is further configured to generate, according to the encapsulation process of the ith segmented video, an independently coded region description box of the ith independently coded region.

In an implementation, the processing unit 602 is further configured to determine, according to a resolution of the ith segmented video, a coordinate system to which the ith independently coded region belongs; and configure, according to the determined coordinate system to which the ith independently coded region belongs, a value of the coordinate system identification field of the ith independently coded region.

In an implementation, the coordinate infobox includes a size field of the complete video under the coordinate system to which the ith independently coded region belongs. The size field of the complete video includes a height field of the complete video and a width field of the complete video.

The processing unit 602 is further configured to generate, according to the encapsulation process of the ith segmented video, an independently coded region description box of the ith independently coded region.

In an implementation, the processing unit 602 is further configured to acquire the height and width of the complete video composed of segmented videos corresponding to all the independently coded regions under the coordinate system to which the ith independently coded region belongs; and configure the acquired height of the complete video as the value of the height field of the complete video, and configure the acquired width of the complete video as the value of the width field of the complete video.

In an implementation, the independently coded region box includes a vertex coordinate field of the ith independently coded region in the coordinate system to which it belongs and a size field of the ith independently coded region; the vertex coordinate field includes an abscissa field of the ith independently coded region in the coordinate system to which it belongs and an ordinate field of the ith independently coded region in the coordinate system to which it belongs; the size field includes the height field of the ith independently coded region and the width field of the ith independently coded region.

The processing unit 602 is further configured to generate an independently coded region description box of the ith independently coded region according to an encapsulation process of the ith segmented video.

In an implementation, the processing unit 602 is further configured to acquire the values of the abscissa and ordinate of the vertex of the ith independently coded region in the coordinate system to which it belongs; configure the acquired value of the abscissa of the ith independently coded region in the coordinate system to which it belongs as the value of the abscissa field of the ith independently coded region in the coordinate system to which it belongs, and configure the acquired value of the ordinate of the ith independently coded region in the coordinate system to which it belongs as the value of the ordinate field of the ith independently coded region in the coordinate system to which it belongs; acquire the height and width of the ith independently coded region; and configure the acquired height of the ith independently coded region as the value of the height field of the ith independently coded region, and configure the acquired width of the ith independently coded region as the value of the width field of the ith independently coded region.

In an implementation, the independently coded region box includes a dependently presented flag field of the ith independently coded region.

The processing unit 602 is further configured to generate, according to the encapsulation process of the ith segmented video, an independently coded region description box of the ith independently coded region.

In an implementation, the processing unit 602 is further configured to configure the dependently presented flag field of the ith independently coded region as a valid value when the ith independently coded region is presented simultaneously with independently coded regions in other tracks in the track group to which the ith independently coded region belongs.

In an implementation, the independently coded region box includes a mergeable flag field of the ith independently coded region.

The processing unit 602 is further configured to generate, according to the encapsulation process of the ith segmented video, an independently coded region description box of the ith independently coded region.

In an implementation, the processing unit 602 is further configured to configure the mergeable flag field of the ith independently coded regions as an invalid value when a bitstream contained in the track to which the ith independently coded region belongs can be merged with bitstreams contained in other tracks in the track group to which the ith independently coded region belongs.

In an implementation, the independently coded region box includes a track priority information flag field of the ith independently coded region.

The processing unit 602 is further configured to generate, according to the encapsulation process of the ith segmented video, an independently coded region description box of the ith independently coded region.

In an implementation, the processing unit 602 is further configured to configure the track priority information flag field as an invalid value when priorities of the independently coded regions in all tracks in the track group to which the ith independently coded region belongs are the same; and configure the track priority information flag field as a valid value when priorities of the independently coded regions in all the tracks in the track group to which the ith independently coded region belongs are different.

When the track priority information flag field is configured as a valid value, the independently coded region box further includes a track priority field of the ith independently coded region.

The processing unit 602 is further configured to generate, according to the encapsulation process of the ith segmented video, an independently coded region description box of the ith independently coded region.

In an implementation, the processing unit 602 is further configured to configure the priority of the ith independently coded region as the value of the track priority field.

In an implementation, the independently coded region box includes a track overlap information flag field of the ith independently coded region. The processing unit 602 is further configured to generate, according to the encapsulation process of the ith segmented video, an independently coded region description box of the ith independently coded region.

In an implementation, the processing unit 602 is further configured to configure the track overlap information flag field as an invalid value when the ith independently coded region and the independently coded regions in other tracks in the track group to which the ith independently coded region belongs are not displayed in an overlapping manner; and configure the track overlap information flag field as a valid value when the ith independently coded region and the independently coded regions in other tracks in the track group to which the ith independently coded region belongs are displayed in an overlapping manner.

When the track overlap information flag field is configured as a valid value, the independently coded region box further includes a background flag field of the ith independently coded region. The generating an independently coded region description box of the ith independently coded region according to an encapsulation process of the ith segmented video further includes: configuring the background flag field of the ith independently coded region an invalid value when the ith independently coded region is required to be displayed as a foreground picture of independently coded regions in other tracks in the track group to which the ith independently coded region belongs; and configuring the background flag field of the ith independently coded region a valid value when the ith independently coded region is required to be displayed as a background picture of the independently coded regions in other tracks in the track group to which the ith independently coded region belongs.

In an implementation, when the background flag field is configured as a valid value, the independently coded region box further includes a transparency field of the ith independently coded region, and the value of the transparency field is greater than or equal to 0. The processing unit 602 is further configured to generate, according to the encapsulation process of the ith segmented video, an independently coded region description box of the ith independently coded region.

In an implementation, the processing unit 602 is further configured to configure the value of the transparency field as 0 when the ith independently coded region is required to be displayed as a transparent background picture; and configure the value of the transparency field according to the transparency of the ith independently coded region when the ith independently coded region is required to be displayed as a non-transparent background picture.

In an implementation, the processing unit 602 is further configured to generate, according to the encapsulation process of the N segmented videos of the immersive media, an independently coded region description signaling file, the independently coded region description signaling file being encapsulated in an adaptation set in a media presentation description file of the immersive media. The independently coded region description signaling file includes description information of the independently coded region description box of the ith independently coded region.

Figure 7:
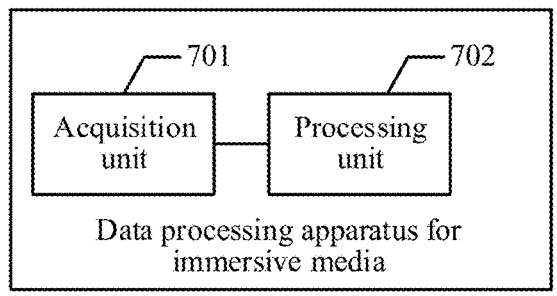
FIG. 7 illustrates a schematic structural diagram of another data processing apparatus for an immersive media provided by an embodiment of this disclosure.

Referring to FIG. 7, FIG. 7 illustrates a schematic structural diagram of another data processing apparatus for an immersive media provided by an embodiment of this disclosure. The data processing apparatus for an immersive media may be a computer program (including a program code) running in the content playback device. For example, the data processing apparatus for an immersive media may be application software in the content playback device. As shown in FIG. 7, the data processing apparatus for an immersive media includes an acquisition unit 701 and a processing unit 702. One or more modules, submodules, and/or units of the apparatus can be implemented by processing circuitry, software, or a combination thereof, for example.

In one exemplary embodiment, the immersive media includes N segmented videos; the N segmented videos are respectively encapsulated to N tracks; an ith segmented video is encapsulated in an ith track; the N tracks belong to a same track group; the data processing apparatus for an immersive media may be used for implementing the corresponding steps in the method shown in FIG. 2:

The acquisition unit 701 is configured to acquire an independently coded region description box of an ith independently coded region of an immersive media, the ith independently coded region corresponding to an ith segmented video; the independently coded region description box including an independently coded region box and a coordinate infobox, i and N being positive integers, and i≤N.

The processing unit 702 is configured to display the ith segmented video of the immersive media according to the independently coded region description box.

In an implementation, the acquisition unit 701 is further configured to acquire an independently coded region description signaling file, the independently coded region description signaling file being encapsulated in an adaptation set in a media presentation description file of the immersive media. The independently coded region description signaling file includes description information of the independently coded region description box of the ith independently coded region.

In another exemplary embodiment, the data processing apparatus for an immersive media may be used for implementing the corresponding steps in the method shown in FIG. 5:

The acquisition unit 701 is configured to acquire a packed file of an immersive media, the immersive media including N segmented videos, the N segmented videos being respectively encapsulated to N tracks, and an ith segmented video being encapsulated in an ith track; the N tracks belonging to a same track group; the ith segmented video corresponding to an ith independently coded region; and the packed file at least including the ith track, the ith track including an independently coded region description box of the ith independently coded region, i and N being positive integers, and i≤N.

The processing unit 702 is configured to de-encapsulate the packed file to obtain the independently coded region description box of the ith independently coded region, the independently coded region description box including an independently coded region box and a coordinate infobox; and display the ith segmented video of the immersive media according to the independently coded region description box.

In an implementation, the acquisition unit 701 is further configured to acquire an independently coded region description signaling file of the immersive media, the independently coded region description signaling file being encapsulated in an adaptation set in a media presentation description file of the immersive media; the independently coded region description signaling file including description information of the independently coded region description box of the ith independently coded region; and acquire a packed file of the immersive media. For example, acquire a packed file of the immersive media according to the independently coded region description signaling file.

According to one embodiment of the present disclosure, each unit in the data processing apparatus for an immersive media shown in FIG. 6 and FIG. 7 may be respectively or all merged into one or several other units, or a certain (some) of them may be divided into multiple units with smaller functions. This can achieve the same operation without affecting the achievement of the technical effects of the embodiments of the present disclosure. The foregoing units are divided based on logical functions. In an actual application, a function of one unit may also be implemented by a plurality of units, or may be implemented by one unit. In other embodiments of this disclosure, the data processing apparatus for an immersive media may also include other units. In an actual application, the functions may also be cooperatively implemented by other units and may be cooperatively implemented by a plurality of units. According to another embodiment of this disclosure, a computer program runs on a general-purpose computing device, such as a computer, that includes a central processing unit (CPU), a random access memory (RAM), a read-only memory (ROM), and other processing elements and storage elements. The computer program, when executed, implements the data processing method for an immersive media provided by the embodiments of this disclosure. The computer program may be recorded on, for example, a computer-readable recording medium (e.g., a non-transitory computer-readable storage medium), and may be loaded into the foregoing computing device by using the computer-readable recording medium and run on the computing device.

Based on the same concept, the principles and beneficial effects of the data processing apparatus for an immersive media in this embodiment of this disclosure for solving problems are similar to the principles and beneficial effects of the data processing method for an immersive media in the embodiments of the embodiments for solving problems, may refer to the principles and beneficial effects of the implementation of the method, and will not be repeated here for the sake of brevity.

Figure 8:
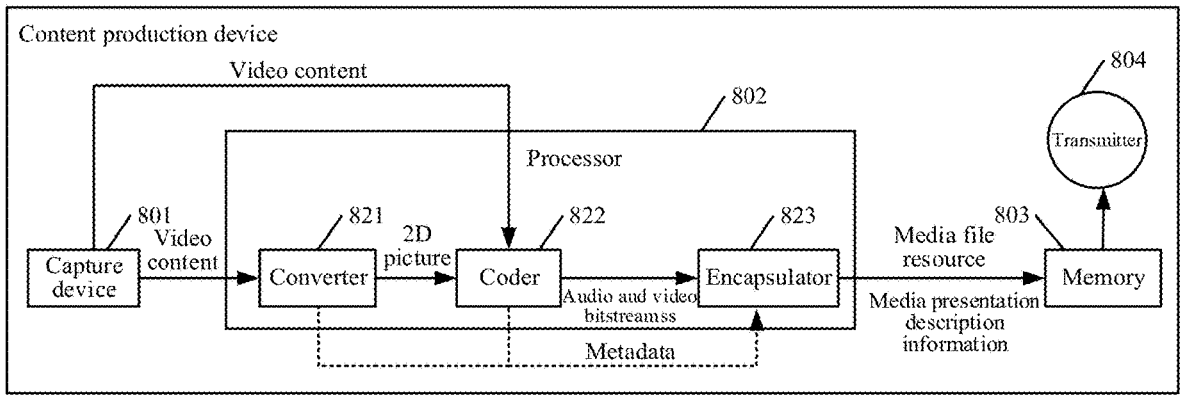
FIG. 8 illustrates a schematic structural diagram of a content production device provided by an embodiment of this disclosure.

FIG. 8 illustrates a schematic structural diagram of a content production device provided by an embodiment of this disclosure. The content production device may refer to a computer device used by a provider of the immersive media, and the computer device may be a terminal (such as a PC and a smart mobile device (such as a smart phone)) or a server. As shown in FIG. 8, the content production device includes a capture device 801, a processor 802, a memory 803, and a transmitter 804. One or more modules, submodules, and/or units of the apparatus can be implemented by processing circuitry, software, or a combination thereof, for example.

The capture device 801 is configured to capture an audible-visual scenario of a real world to obtain original data of the immersive media (including temporally and spatially synchronized audio content and video content). The capture device 801 may include, but is not limited to: an audio device, a camera device, and a sensing device. The audio device may include an audio sensor, a microphone, and the like. The camera device may include an ordinary camera, a stereo camera, a light field camera, and the like. The sensing device may include a laser device, a radar device, and the like.

The processor 802 (or CPU) is a processing core of the content production device. Processing circuitry such as the processor 802 is suitable for implementing one or more program instructions, and is suitable for loading and executing one or more program instructions so as to achieve the flow of the data processing method for an immersive media shown in FIG. 2 or FIG. 3.

The memory 803 is a memory device in the content production device, and is configured to store programs and media resources. It is to be understood that the memory 803 here can include both a built-in storage medium in the content production device, and certainly also an extended storage medium supported by the content production device. The memory may be a high-speed random access memory (RAM), or may be a non-volatile memory, for example, at least one magnetic disk memory. There may also be at least one memory located away from the aforementioned processor. The memory provides a storage space used for storing an operating system of the content production device. In addition, the storage space is also used for storing a computer program. The computer program includes program instructions, and the program instructions are suitable for being referred to as and executed by the processor, so as to execute all the steps of the data processing method for an immersive media. In addition, the memory 803 can also be configured to store an immersive media file formed after processing by the processor. The immersive media file includes media file resources and MPD information.

The transmitter 804 is configured to achieve transmission interaction between the content production device and other devices, for example, to achieve transmission of the immersive media between the content production device and the content playback device. That is, the content production device transmits the relevant media resources of the immersive media to the content playback device through the transmitter 804.

Referring to FIG. 8 again, the processor 802 may include units such as a converter 821, a coder 822, and an encapsulator 823.

The converter 821 is configured to perform a series of conversion processes on captured video content to make the video content become content that is suitable for being subjected to video coding for the immersive media. The conversion processing may include: stitching and projection. The conversion processing also includes region encapsulation. The converter 821 can convert captured 3D video content into 2D pictures and provide them to the coder for video coding.

The coder 822 is configured to perform audio coding on the captured audio content to form an audio bitstream of the immersive media. It is also configured to perform video coding on the 2D pictures obtained by conversion by the converter 821, so as to obtain a video bitstream.

The encapsulator 823 is configured to encapsulate the audio bitstream and the video bitstream in a file container according to a file format of the immersive media (e.g., the ISOBMFF) to form a media file resource of the immersive media, and the media file resource can be a media file or media segments that form a media file of the immersive media; the MPD information is used to record metadata of the media file resources of the immersive media according to the requirement for the file format of the immersive media. The encapsulated file of the immersive media processed by the encapsulator will be stored in the memory, and provided to the content playback device on demand for the presentation of the immersive media.

In one exemplary embodiment, the immersive media includes N segmented videos; the N segmented videos are respectively encapsulated to N tracks; an ith segmented video is encapsulated in an ith track; the N tracks belong to a same track group. The processor 802 (i.e., each device or unit included or implemented in the processor) executes all the steps of the data processing method for an immersive media shown in FIG. 2 by invoking one or more instructions in the memory. The memory 803 stores one or more first instructions, and the one or more first instructions are suitable for being loaded by the processor 802 and executing the following steps:

acquiring an independently coded region description box of an ith independently coded region of an immersive media, the ith independently coded region corresponding to an ith segmented video; the independently coded region description box including an independently coded region box and a coordinate infobox, i and N being positive integers, and i≤N; and displaying the ith segmented video of the immersive media according to the independently coded region description box.

In another exemplary embodiment, the processor executes all the steps of the data processing method for an immersive media shown in FIG. 3 by invoking one or more instructions in the memory 803. The memory stores one or more second instructions, and the one or more second instructions are suitable for being loaded by the processor 802 and executing the following steps:

partitioning an immersive media into N segmented videos; respectively encapsulating the N segmented videos into N tracks, an ith segmented video being encapsulated in an ith track; the ith segmented video corresponding to an ith independently coded region, i and N being positive integers, and i≤N; and the N tracks belonging to a same track group; and generating an independently coded region description box of the ith independently coded region according to an encapsulation process of the ith segmented video, the independently coded region description box including an independently coded region box and a coordinate infobox.

Figure 9:
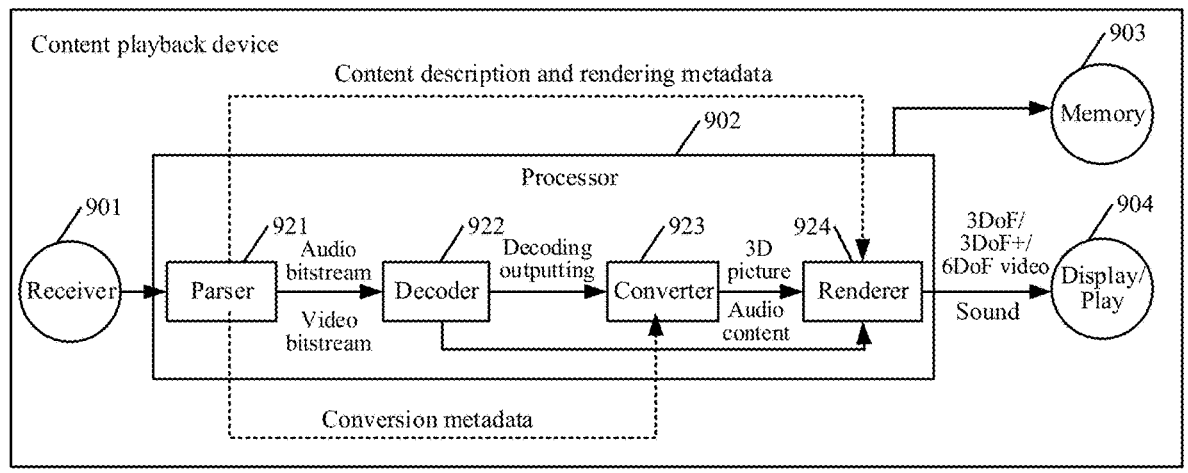
FIG. 9 illustrates a schematic structural diagram of a content playback device provided by an embodiment of this disclosure.

FIG. 9 illustrates a schematic structural diagram of a content playback device provided by one exemplary embodiment of this disclosure. The content playback device may refer to a computer device used by a user of the immersive media, and the computer device may be a terminal (e.g., a PC, a smart mobile device such as a smartphone, a VR device such as a VR helmet and VR glasses). As shown in FIG. 9, the content playback device includes a receiver 901, a processor 902, a memory 903, and a display/playback apparatus 904. One or more modules, submodules, and/or units of the apparatus can be implemented by processing circuitry, software, or a combination thereof, for example.

The receiver 901 is configured to realize the transmission interaction between a decoding device and other devices, for example, to realize the transmission of the immersive media between the content production device and the content playback device. That is, the content playback device receives, through the receiver 901, relevant media resources of the immersive media transmitted by the content production device.

The processor 902 (or CPU) is a processing core of the content production device. Processing circuitry such as the processor 902 is suitable for implementing one or more program instructions, and is suitable for loading and executing one or more program instructions so as to achieve the flow of the data processing method for an immersive media shown in FIG. 2 or FIG. 5.

The memory 903 is a memory device in the content playback device, and is configured to store programs and media resources. It is to be understood that the memory 903 here can include both a built-in storage medium in the content playback device, and certainly also an extended storage medium supported by the content playback device. The memory 903 may be a high-speed random access memory (RAM), or may be a non-volatile memory, for example, at least one magnetic disk memory, or may be at least one computer storage medium located far away from the foregoing processor. The memory 903 provides a storage space for storing an operating system of the content playback device. In addition, the storage space is also used for storing a computer program. The computer program includes program instructions, and the program instructions are suitable for being referred to as and executed by the processor, so as to execute all the steps of the data processing method for an immersive media. In addition, the memory 903 may also be configured to store three-dimensional pictures of the immersive media formed after processing by the processor, audio content corresponding to the three-dimensional pictures, information required for rendering the three-dimensional pictures and the audio content, and the like.

The display/playback apparatus 904 is configured to output rendered sounds and three-dimensional pictures.

Referring to FIG. 9 again, the processor 902 may include units such as a parser 921, a decoder 922, a converter 923, and a renderer 924.

The parser 921 is configured to perform file de-encapsulation on an encapsulated file of a rendering media from the content production device, such as, to de-encapsulate a media file resource according to the requirement for the file format of the immersive media, so as to obtain an audio bitstream and a video bitstream; provide the audio bitstream and the video bitstream to the decoder 922.

The decoder 922 is configured to perform audio decoding on the audio bitstream to obtain audio content and provide the audio content to the renderer for audio rendering. In addition, the decoder 922 decodes the video bitstream to obtain a 2D picture. According to metadata provided by MPD information, if the metadata indicates that the immersive media has been subjected to the region encapsulation process, the 2D picture refers to an encapsulated picture; when the metadata indicates that the immersive media has been subjected to the region encapsulation process, the 2D picture refers to a projected picture.

The converter 923 is configured to convert the 2D picture into a 3D picture. When the immersive media has been subjected to the region encapsulation process, the converter 923 will first perform the region de-encapsulation on the encapsulated picture to obtain the projected picture. The projected picture is then reconstructed to obtain a 3D picture. When the rendering medium has not been subjected to the region encapsulation process, the converter 923 will directly reconstruct the projected picture to obtain a 3D picture.

The renderer 924 is configured to render audio content and the 3D picture of the immersive media. For example, the audio content and the 3D picture are rendered according to the metadata related to rendering and windows in the MPD information. After the rendering is completed, the display/playback apparatus performs outputting.

In one exemplary embodiment, the immersive media includes N segmented videos; the N segmented videos are respectively encapsulated to N tracks; an ith segmented video is encapsulated in an ith track; the N tracks belong to a same track group. The processor 902 (i.e., each device or unit included or implemented in the processor) executes all the steps of the data processing method for an immersive media shown in FIG. 2 by invoking one or more instructions in the memory. The memory stores one or more first instructions, and the one or more first instructions are suitable for being loaded by the processor 902 and executing the following steps:

acquiring an independently coded region description box of an ith independently coded region of an immersive media, the ith independently coded region corresponding to an ith segmented video; the independently coded region description box including an independently coded region box and a coordinate infobox, i and N being positive integers, and i≤N; and displaying the ith segmented video of the immersive media according to the independently coded region description box.

In another exemplary embodiment, the processor 902 (i.e., each device or unit included or implemented in the processor) executes all the steps of the data processing method for an immersive media shown in FIG. 5 by invoking one or more instructions in the memory. The memory 903 stores one or more second instructions, and the one or more second instructions are suitable for being loaded by the processor 902 and executing the following steps:

acquiring a packed file of an immersive media, the immersive media including N segmented videos, the N segmented videos being respectively encapsulated to N tracks, and an ith segmented video being encapsulated in an ith track; the N tracks belonging to a same track group, the ith segmented video corresponding to an ith independently coded region; the packed file at least including the ith track, the ith track including an independently coded region description box of the ith independently coded region, i and N being positive integers, and i≤N; de-encapsulating the packed file to obtain the independently coded region description box of the ith independently coded region, the independently coded region description box including an independently coded region box and a coordinate infobox; and displaying the ith segmented video of the immersive media according to the independently coded region description box.

Based on the same concept, the principles and beneficial effects of the content production device and the content playback device provided in the embodiments of this disclosure for solving problems are similar to the principles and beneficial effects of the data processing method for an immersive media in the method embodiments of this disclosure for solving problems, may refer to the principles and beneficial effects of the implementation of the method, and will not be repeated here for the sake of brevity.

The foregoing disclosure merely describes exemplary embodiments of this disclosure, and is not intended to limit the scope of this disclosure. Other embodiments and equivalent variations are within the scope of this disclosure.

What is claimed is:

1. A data processing method for an immersive media, the method comprising:

acquiring, by processing circuitry, independently coded region description information of an independently coded region of the immersive media, the independently coded region corresponding to a segmented video of a plurality of segmented videos encapsulated in tracks of a same track group, the independently coded region description information including an independently coded region information and coordinate information, the coordinate information including coordinate system identification information that indicates a coordinate system of the independently coded region; and displaying the segmented video of the immersive media according to the independently coded region description information, wherein the independently coded region information includes a track priority information flag of the independently coded region;

when the track priority information flag is an invalid value, priorities of independently coded regions in all tracks in the track group of the independently coded region are the same;

when the track priority information flag is a valid value, the independently coded region information further includes track priority information of the independently coded region, the track priority information indicating a priority of the independently coded region; and when a resolution of the independently coded region is higher than a resolution of another independently coded region, the priority of the independently coded region is higher than a priority of the independently coded region.

2. The data processing method according to claim 1, wherein when a resolution of the segmented video is the same as another segmented video of the plurality of segmented videos, the independently coded region of the segmented video and the independently coded region of the other segmented video belong to a same coordinate system; and when the resolution of the segmented video is different from the other segmented video of the plurality of segmented videos, the independently coded region of the segmented video and the independently coded region of the other segmented video belong to different coordinate systems.

3. The data processing method according to claim 2, wherein the coordinate information includes size information of a video under the coordinate system of the independently coded region, the size information indicating a height and a width of the video; and the video is composed of the segmented videos corresponding to all the independently coded regions under the coordinate system of the independently coded region.

4. The data processing method according to claim 1, wherein the independently coded region information includes vertex coordinate information of the independently coded region in the coordinate system of the independently coded region and size information of the independently coded region;

the vertex coordinate information includes abscissa information of the independently coded region in the coordinate system of the independently coded region and ordinate information of the independently coded region in the coordinate system of the independently coded region; and the size information indicates a height and a width of the independently coded region.

5. The data processing method according to claim 1, wherein the independently coded region information includes a dependently presented flag of the independently coded region; and when the dependently presented flag of the independently coded region is a valid value, the independently coded region and the independently coded regions in other tracks in the track group of the independently coded region are presented simultaneously.

6. The data processing method according to claim 1, wherein the independently coded region information includes a mergeable flag of the independently coded region; and when the mergeable flag of the independently coded region is an invalid value, a bitstream contained in a track of the independently coded region can be merged with bitstreams contained in other tracks in the track group of the independently coded region.

7. The data processing method according to claim 1, wherein the independently coded region information includes a track overlap information flag of the independently coded region;

when the track overlap information flag is an invalid value, the independently coded region does not overlap independently coded regions in other tracks in the track group of the independently coded region;

when the track overlap information flag is a valid value, the independently coded region information further includes a background flag of the independently coded region;

when the background flag is an invalid value, the independently coded region is displayed as a foreground picture of the independently coded regions in the other tracks in the track group of the independently coded region; and when the background flag is a valid value, the independently coded region is displayed as a background picture of the independently coded regions in the other tracks in the track group of the independently coded region.

8. The data processing method according to claim 7, wherein when the background flag is the valid value, the independently coded region information further includes transparency information of the independently coded region, the transparency information indicating a transparency during display of the independently coded region as the background picture.

9. The data processing method according to claim 1, further comprising:

acquiring an independently coded region description signaling file, the independently coded region description signaling file being encapsulated in an adaptation set in a media presentation description file of the immersive media; and the independently coded region description signaling file including description information of the independently coded region description information of the independently coded region.

10. The data processing method according to claim 1, further comprising:

acquiring a packed file of the immersive media, the immersive media including the plurality of segmented videos encapsulated into respective tracks, the plurality of tracks belonging to the same track group; and de-encapsulating the packed file to acquire the independently coded region description information of the independently coded region.

11. The data processing method according to claim 1, wherein the coordinate system identification information includes a value that is associated with a resolution of the segmented video, and coordinate system identification information of the independently coded regions of the plurality of segmented videos with different resolutions include different values.

12. A data processing method for an immersive media, comprising:

partitioning an immersive media into a plurality of segmented videos;

encapsulating the plurality of segmented videos into respective tracks in a same track group, a segmented video of the plurality of segmented videos corresponding to an independently coded region; and generating, by processing circuitry, independently coded region description information of the independently coded region according to the encapsulation of the segmented video, the independently coded region description information including independently coded region information and coordinate information, the coordinate information including coordinate system identification information that indicates a coordinate system of the independently coded region, wherein the independently coded region information includes a track priority information flag of the independently coded region;

when priorities of independently coded regions in all tracks in the track group of the independently coded region are the same, the track priority information flag is an invalid value;

when the priorities of the independently coded regions in all the tracks in the track group of the independently coded region are different, the track priority information flag is a valid value; and when the track priority information flag is the valid value, the independently coded region information further includes track priority information of the independently coded region.

13. The data processing method according to claim 12, wherein when a resolution of the segmented video is the same as another segmented video of the plurality of segmented videos, the independently coded region of the segmented video and the independently coded region of the other segmented video belong to a same coordinate system; and when the resolution of the segmented video is different from the other segmented video of the plurality of segmented videos, the independently coded region of the segmented video and the independently coded region of the other segmented video belong to different coordinate systems.

14. The data processing method according to claim 12, wherein the coordinate information includes size information of a video under the coordinate system of the independently coded region, the size information of the video indicating a height and a width of the video; and the video is composed of the segmented videos corresponding to all the independently coded regions under the coordinate system of the independently coded region.

15. The data processing method according to claim 12, wherein the independently coded region information includes vertex coordinate information of the independently coded region in the coordinate system of the independently coded region and size information of the independently coded region;

the vertex coordinate information includes abscissa information of the independently coded region in the coordinate system of the independently coded region and ordinate information of the independently coded region in the coordinate system of the independently coded region; and the size information indicates a height and a width of the independently coded region.

16. The data processing method according to claim 12, wherein the independently coded region information includes a dependently presented flag of the independently coded region; and when the independently coded region and the independently coded regions in other tracks in the track group of the independently coded region are presented simultaneously, the dependently presented flag of the independently coded region is a valid value.

17. The data processing method according to claim 12, wherein the independently coded region information includes a mergeable flag of the independently coded region; and when a bitstream contained in a track of the independently coded region can be merged with bitstreams contained in other tracks in the track group of the independently coded region, the mergeable flag of the independently coded region is an invalid value.

18. The data processing method according to claim 12, wherein the independently coded region information includes a track overlap information flag of the independently coded region;

when the independently coded region and the independently coded regions in other tracks in the track group of the independently coded region are not required to be displayed in an overlapping manner, the track overlap information flag is an invalid value;

when the independently coded region and the independently coded regions in the other tracks in the track group of the independently coded region are required to be displayed in the overlapping manner, the track overlap information flag is a valid value;

when the track overlap information flag is the valid value, the independently coded region information further includes a background flag of the independently coded region;

when the independently coded region is required to be displayed as a foreground picture of the independently coded regions in the other tracks in the track group of the independently coded region, the background flag of the independently coded region is an invalid value; and when the independently coded region is required to be displayed as a background picture of the independently coded regions in the other tracks in the track group of the independently coded region, the background flag of the independently coded region is a valid value.

19. The data processing method according to claim 12, wherein the coordinate system identification information includes a value that is associated with a resolution of the segmented video, and coordinate system identification information of the independently coded regions of the plurality of segmented videos with different resolutions include different values.

20. A data processing apparatus, comprising:

processing circuitry configured to:

acquire independently coded region description information of an independently coded region of an immersive media, the independently coded region corresponding to a segmented video of a plurality of segmented videos encapsulated in tracks of a same track group, the independently coded region description information including an independently coded region information and coordinate information, the coordinate information including coordinate system identification information that indicates a coordinate system of the independently coded region; and output for display the segmented video of the immersive media according to the independently coded region description information, wherein the independently coded region information includes a track priority information flag of the independently coded region;

when the track priority information flag is an invalid value, priorities of independently coded regions in all tracks in the track group of the independently coded region are the same;

when the track priority information flag is a valid value, the independently coded region information further includes track priority information of the independently coded region, the track priority information indicating a priority of the independently coded region; and when a resolution of the independently coded region is higher than a resolution of another independently coded region, the priority of the independently coded region is higher than a priority of the independently coded region.

* * * * *